US009673468B2

(12) United States Patent
Izuhara et al.

(10) Patent No.: US 9,673,468 B2
(45) Date of Patent: Jun. 6, 2017

(54) POLYMER ELECTROLYTE MATERIAL, POLYMER ELECTROLYTE MOLDED PRODUCT USING THE POLYMER ELECTROLYTE MATERIAL AND METHOD FOR MANUFACTURING THE POLYMER ELECTROLYTE MOLDED PRODUCT, MEMBRANE ELECTRODE COMPOSITE, AND SOLID POLYMER FUEL CELL

(71) Applicant: TORAY INDUSTRIES, INC., Tokyo (JP)

(72) Inventors: Daisuke Izuhara, Tokyo (JP); Yuriko Okada, Tokyo (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/304,643

(22) Filed: Jun. 13, 2014

(65) Prior Publication Data

US 2015/0155582 A1 Jun. 4, 2015

Related U.S. Application Data

(62) Division of application No. 12/377,263, filed as application No. PCT/JP2007/065490 on Aug. 8, 2007, now abandoned.

(30) Foreign Application Priority Data

Aug. 11, 2006 (JP) .................. 2006-219539

(51) Int. Cl.
C08L 61/12 (2006.01)
C08L 71/10 (2006.01)
H01M 8/10 (2016.01)
C08G 65/40 (2006.01)
H01M 8/1025 (2016.01)
C08J 5/22 (2006.01)
H01B 1/12 (2006.01)
H01M 8/1067 (2016.01)
H01M 8/1072 (2016.01)
H01M 8/1018 (2016.01)

(52) U.S. Cl.
CPC ...... H01M 8/1025 (2013.01); C08G 65/4012 (2013.01); C08G 65/4056 (2013.01); C08J 5/2256 (2013.01); H01B 1/122 (2013.01); H01M 8/1067 (2013.01); H01M 8/1072 (2013.01); C08J 2371/12 (2013.01); C08J 2387/00 (2013.01); C08L 2205/05 (2013.01); H01M 2008/1095 (2013.01); H01M 2300/0082 (2013.01); Y02P 20/582 (2015.11); Y02P 70/56 (2015.11)

(58) Field of Classification Search
CPC ... C08L 61/12; H01M 8/1025; C08G 65/4056
See application file for complete search history.

(56) References Cited

U.S. PATENT DOCUMENTS

| 5,362,836 | A  | 11/1994 | Helmer-Metzmann et al. |
| 5,504,157 | A  | 4/1996  | Eisenbach et al.       |
| 5,561,202 | A  | 10/1996 | Helmer-Metzmann et al. |
| 5,693,740 | A  | 12/1997 | Colquhoun et al.       |
| 6,214,488 | B1 | 4/2001  | Helmer-Metzmann et al. |
| 6,444,341 | B1 | 9/2002  | Yen et al.             |

(Continued)

FOREIGN PATENT DOCUMENTS

| JP | 6093114   | 4/1994 |
| JP | 2003031232 | 1/2003 |

(Continued)

OTHER PUBLICATIONS

Greene, et al., Protection for the Carbonyl Group:, Protective Groups in Organic Synthesis, pp. 175-184.
Christian Bailly, et al. "The Sodium Salts of Sulphonated Poly(aryl-ether-ether-ketone)(PEEK): Preparation and characterization"; Department of Polymer Science and Engineering, University of Massachusetts; Polymer, May 1987, vol. 28.
R. Nolte Partially sulfonated poly(arylene ether sulfone)—A versatile proton conducting membrane material for modern energy conversion technologies: Journal of Membrane Science, No. 83, 1993, pp. 211-220.

(Continued)

Primary Examiner — Liam J Heincer
(74) Attorney, Agent, or Firm — Pillsbury Winthrop Shaw Pittman LLP

(57) ABSTRACT

It is an object of the present invention to provide a polymer electrolyte material which has excellent proton conductivity even under the conditions of a low humidity or a low temperature and is excellent in mechanical strength and fuel barrier properties, and which moreover can achieve high output, high energy density and long-term durability in forming a polymer electrolyte fuel cell therefrom, and a polymer electrolyte form article using the same and a method for producing the same, a membrane electrode assembly and a polymer electrolyte fuel cell, each using the same.

The present invention employs the following means. Namely, the polymer electrolyte material of the present invention is a polymer electrolyte material including a constituent unit (A1) containing an ionic group and a constituent unit (A2) substantially not containing an ionic group, wherein a phase separation structure is observed by a transmission electron microscope and a crystallization heat measured by differential scanning calorimetry is 0.1 J/g or more, or a phase separation structure is observed by a transmission electron microscope and the degree of crystallinity measured by wide angle X-ray diffraction is 0.5% or more. Also, the polymer electrolyte form article, the membrane electrode assembly and the polymer electrolyte fuel cell of the present invention are characterized by being composed of such polymer electrolyte materials.

14 Claims, No Drawings

(56) References Cited

U.S. PATENT DOCUMENTS

| | | |
|---|---|---|
| 7,022,810 B1 | 4/2006 | Cornelius |
| 7,544,764 B2 | 6/2009 | McGrath et al. |
| 7,736,539 B2 | 6/2010 | Colquhoun et al. |
| 7,803,884 B2 | 9/2010 | Onodera et al. |
| 2001/0021764 A1 | 9/2001 | Weisse et al. |
| 2005/0221193 A1 | 10/2005 | Kinouchi et al. |
| 2006/0029854 A1 | 2/2006 | Watakabe et al. |
| 2006/0043344 A1 | 3/2006 | Okada et al. |
| 2006/0180796 A1 | 8/2006 | Adachi et al. |
| 2007/0010631 A1 | 1/2007 | Watanabe et al. |
| 2007/0020500 A1 | 1/2007 | Kanaoka et al. |
| 2007/0134530 A1 | 6/2007 | Nakamura et al. |
| 2007/0142614 A1 | 6/2007 | Hung et al. |
| 2007/0196712 A1 | 8/2007 | Kim et al. |
| 2007/0218336 A1 | 9/2007 | Kim et al. |
| 2008/0004443 A1 | 1/2008 | Brunelle et al. |
| 2008/0044708 A1 | 2/2008 | Yamaguchi et al. |
| 2008/0075999 A1 | 3/2008 | Izuhara et al. |
| 2008/0171252 A1 | 7/2008 | Hirano et al. |
| 2008/0207781 A1 | 8/2008 | Schuster et al. |
| 2008/0241626 A1 | 10/2008 | Kim et al. |
| 2009/0208806 A1 | 8/2009 | Izuhara et al. |
| 2009/0239125 A1 | 9/2009 | McGrath et al. |
| 2010/0209813 A1 | 8/2010 | Onuma et al. |
| 2010/0273953 A1 | 10/2010 | Weber et al. |
| 2011/0151355 A1 | 6/2011 | Yashiro et al. |

FOREIGN PATENT DOCUMENTS

| | | | |
|---|---|---|---|
| JP | 2003-142125 | 5/2003 | |
| JP | 2004528683 | 9/2004 | |
| JP | 2005-139432 | 6/2005 | |
| JP | 2005-190675 | 7/2005 | |
| JP | 2005-194517 | 7/2005 | |
| JP | 2005-206807 | 8/2005 | |
| JP | 2005-216525 | 8/2005 | |
| JP | 2005-350658 | 12/2005 | |
| JP | 2006-32214 | 2/2006 | |
| JP | 2006512428 | 4/2006 | |
| JP | WO 2006087995 A1 * | 8/2006 | ......... C08G 65/4056 |
| JP | 2006-261103 | 9/2006 | |
| JP | 2007-59374 | 3/2010 | |
| WO | WO2005037892 A1 | 4/2005 | |
| WO | WO2006025351 A1 | 3/2006 | |

OTHER PUBLICATIONS

Chong Kyu Shin, et al. "Block copolymer ionomers for ion conductive membranes" Journal of Membrane Science, No. 245, 2004, pp. 147-161.

Hossein Ghassemi, et al. "Multiblock sulfonated-flourinated poly(arylene ether)s for a proton exchange membrane fuel cell" Polymer. vol. 47, (2006), pp. 4132-4139.

Bochmann et al. Journal of Polymer Science, Part A: Polymer Chemistry, vol. 32, 2493-2500, 1994.

Kelsey et al., Macromolecules 1987, 20, 1204-1212.

* cited by examiner

POLYMER ELECTROLYTE MATERIAL, POLYMER ELECTROLYTE MOLDED PRODUCT USING THE POLYMER ELECTROLYTE MATERIAL AND METHOD FOR MANUFACTURING THE POLYMER ELECTROLYTE MOLDED PRODUCT, MEMBRANE ELECTRODE COMPOSITE, AND SOLID POLYMER FUEL CELL

CROSS REFERENCE TO RELATED APPLICATIONS

This application is divisional of U.S. application Ser. No. 12/377,263 filed on Feb. 11, 2009, which is a national stage entry of International Application No. PCT/JP2007/065490, filed on Aug. 8, 2007, which claims the benefit of priority to Japanese Patent Application No. 2006-219539, filed Aug. 11, 2006, the entire contents of which are herein incorporated by reference.

TECHNICAL FIELD

The present invention relates to a highly practical polymer electrolyte material which has excellent proton conductivity even under the conditions of a low humidity or a low temperature and can achieve excellent mechanical strength, fuel barrier properties and long-term durability, as well as a polymer electrolyte form article, a membrane electrode assembly and a polymer electrolyte fuel cell, each using the same.

BACKGROUND ART

A fuel cell is a kind of electric power supply capable of generating electric energy by electrochemically oxidizing a fuel such as hydrogen or methanol, and an intense interest has been shown towards the fuel cell, as a clean energy supply source, recently. Particularly, it is expected that a polymer electrolyte fuel cell is widely used as a distributed power generation facility of comparatively small scale, and a power generator of mobile bodies such as automobile and marine vessel, because of such high standard operation temperature as about 100° C. and high energy density. Also, an intense interest has been shown towards the polymer electrolyte fuel cell as a power supply of portable mobile equipment and a portable device, and it is expected to install the polymer electrolyte fuel cell in a cellular phone and a personal computer in place of a secondary cell such as nickel-hydrogen cell or lithium ion cell.

In the polymer electrolyte fuel cell, an intense interest has been shown towards a direct methanol type fuel cell in which methanol is directly supplied as a fuel (hereinafter, referred to as DMFC), in addition to a conventional polymer electrolyte fuel cell (hereinafter, referred to as PEFC) using a hydrogen as a fuel. DMFC has such an advantage that the fuel is liquid and no reformer is used and, therefore, energy density is high and an operating time per one fueled of the portable device is very long.

In the fuel cell, anode and cathode in which the reaction capable of generating electricity occurs, and a polymer electrolyte membrane using as a proton conductor between the anode and the cathode constitute a membrane electrode assembly (hereinafter abbreviated to MEA) and a cell comprising separators and MEA interposed between the separators is formed as a unit. The polymer electrolyte membrane is mainly composed of the polymer electrolyte material. The polymer electrolyte material is also used for a binder of an electrocatalyst layer or the like.

As required properties of the polymer electrolyte membrane, high proton conductivity is exemplified, first. Also, since the polymer electrolyte membrane functions as a barrier which prevents a direct reaction between a fuel and oxygen, low fuel permeability is required. Particularly, in a polymer electrolyte membrane for DMFC in which an organic solvent such as methanol is used as the fuel, methanol permeation is referred to as methanol crossover (hereinafter sometimes abbreviated to MCO) and causes a problem such as decrease in cell output and energy efficiency. As other required properties, resistance to solvents is also an important property as long-term durability against a high concentration fuel in DMFC in which the high concentration fuel such as methanol is used. Other required properties include chemical stability for enduring a strong oxidizing atmosphere during operation of a fuel cell, and mechanical strength and physical durability for enduring thinning and cycling of swelling and drying.

As the material of the polymer electrolyte membrane, NAFION® (manufactured by DuPont Co.) as a perfluorosulfonic acid-type polymer has widely been used. NAFION® is very expensive because it is prepared through multi-step synthesis, and also has a problem that fuel crossover is large because of its cluster structure. Also, there were problems that mechanical strength and physical durability of the membrane formed by swelling and drying are lost because of poor resistance to hot water and poor resistance to hot methanol, and that it cannot be used at high temperature because of low softening point, and a problem such as waste disposal after use and a problem that it is difficult to recycle the material.

Furthermore, there was a problem that since proton conductivity depends on a water content of the membrane, it is necessary to maintain a high humidity condition to exert high power generation performance as a fuel cell and a load of a humidifier is increased. Also, below freezing point, there was also a problem that proton conductivity is largely reduced because water in a conducting membrane concerning conductivity is frozen and therefore power generation becomes impossible.

To solve these problems, some studies on a polymer electrolyte material containing a hydrocarbon-type polymer of a nonperfluoro-type polymer as a base have been made. As a polymer structure, particularly intensive study on an aromatic polyether ketone and an aromatic polyethersulfone has been made in view of heat resistance and chemical stability.

For example, there have been proposed a sulfonated compound of a poorly-soluble aromatic polyetherether ketone (examples thereof include such as VICTREX® PEEK®, manufactured by VICTREX Co.) which is an aromatic polyetherketone (see, for example, non-patent document 1), polysulfone in a narrow sense as an aromatic polyethersulfone (hereinafter sometimes abbreviated to PSF) (examples thereof include UDEL P-1700, manufactured by BP Amoco Polymers, Inc.), a sulfonated compound of polyethersulfone (hereinafter sometimes abbreviated to PES) (examples thereof include Sumikaexcel® PES, manufactured by Sumitomo Chemical Co., Ltd.) in a narrow sense (see, for example, non-patent document 2) and the like, but there were a problem that if a content of the ionic group is increased in order to enhance the proton conductivity, a prepared membrane swells and therefore fuel crossover such as methanol or the like is large, and a problem that since the polymer electrolyte material is low in a cohesive force of a polymer chain, stability of a polymer higher-order structure is insufficient and mechanical strength and physical durability of a prepared membrane are insufficient.

Also, in the sulfonated compound (for example, non-patent documents 1 and 2) of an aromatic polyetherketone (hereinafter sometimes abbreviated to PES) (examples thereof include VICTREX PEEK-HT, manufactured by VICTREX Co.), there was a problem that because its crystallinity is high, a polymer having the composition of low density of a sulfonic acid group becomes insoluble in a solvent, resulting in poor processability because of a remained crystal moiety. To the contrary, when the density of the sulfonic acid group is increased so as to enhance processability, the polymer is not crystalline and drastically swells in water and, therefore, the membrane thus formed not only shows large fuel crossover but also is insufficient in mechanical strength and physical durability.

Furthermore, there have been proposed an aromatic polyethersulfone block copolymer (for example, patent document 3) and an aromatic polyetherketone block copolymer (for example, non-patent document 3 and patent document 4). However, also in these copolymers, there was a problem that polymers are brittle and low in structural stability since these polymers use an amorphous polymer such as a PES-type polymer or a PEEK-type polymer having a bulky side chain as a base structure because of solubility constraint and membranes prepared are inferior in dimensional stability, mechanical strength and physical durability.

As described above, the polymer electrolyte material according to prior art is insufficient as a measures for improving economic efficiency, processability, proton conductivity under the conditions of a low humidity or a low temperature, fuel crossover, mechanical strength and therefore long-term durability, and there has never been obtained an industrially useful polymer electrolyte material for a fuel cell.

Non-Patent Document 1: "Polymer", 1987, vol. 28, 1009
Non-Patent Document 2: Journal of Membrane Science, 83 (1993) 211-220
Non-Patent Document 3: "Polymer", 2006, vol. 47, 4132
Patent Document 1: Japanese Unexamined Patent Publication (Kokai) No. 6-93114
Patent Document 2: Published Japanese Translation No. 2004-528683 of the PCT Application
Patent Document 3: Japanese Unexamined Patent Publication (Kokai) No. 2003-31232
Patent Document 4: Published Japanese Translation No. 2006-512428 of the PCT Application

DISCLOSURE OF THE INVENTION

Problems to be Solved by the Invention

In view of the above state of the art, it is an object of the present invention to provide a polymer electrolyte material which has excellent proton conductivity even under the conditions of a low humidity or a low temperature and is excellent in mechanical strength and fuel barrier properties, and which moreover can achieve high output, high energy density and long-term durability in forming a polymer electrolyte fuel cell therefrom, and a polymer electrolyte form article using the same and a method for producing the same, a membrane electrode assembly and a polymer electrolyte fuel cell, each using the same.

Means for Solving the Problems

The present invention employs the following means so as to solve such problems. Namely, the polymer electrolyte material of the present invention is a polymer electrolyte material including a constituent unit (A1) containing an ionic group and a constituent unit (A2) substantially not containing an ionic group, wherein a phase separation structure is observed by a transmission electron microscope and a crystallization heat measured by differential scanning calorimetry is 0.1 J/g or more, or a phase separation structure is observed by a transmission electron microscope and the degree of crystallinity measured by wide angle X-ray diffraction is 0.5% or more. Also, the polymer electrolyte form article, the membrane electrode assembly and the polymer electrolyte fuel cell of the present invention are characterized by being composed of such polymer electrolyte materials.

Effects of the Invention

According to the present invention, it is possible to provide a polymer electrolyte material which has excellent proton conductivity even under the conditions of a low humidity or a low temperature and is excellent in mechanical strength and fuel barrier properties, and which moreover can achieve high output, high energy density and long-term durability in forming a polymer electrolyte fuel cell therefrom, and a polymer electrolyte form article using the same and a method for producing the same, a membrane electrode assembly and a polymer electrolyte fuel cell, each using the same.

BEST MODE FOR CARRYING OUT THE INVENTION

Hereinafter, the present invention will be described in detail.

The present invention has intensively studied on the above problem, namely, a polymer electrolyte material which has excellent proton conductivity even under the conditions of a low humidity or a low temperature and is excellent in mechanical strength, resistance to solvents and fuel barrier properties, and which moreover can achieve high output, high energy density and long-term durability in forming a polymer electrolyte fuel cell therefrom, and found that proton conductivity performance of the polymer electrolyte material is largely influenced by a phase separation structure of the polymer electrolyte material, namely, an aggregation state of a constituent unit (A1) containing an ionic group and a constituent unit (A2) substantially not containing an ionic group and a configuration of the aggregation, and that performance of fuel barrier properties, mechanical strength and long-term durability of the polymer electrolyte material are largely influenced by the stabilization of a polymer higher-order structure, namely, crystallinity or a crystalline state and an amorphous state of a polymer.

Namely, it was found that when the polymer electrolyte material is a polymer electrolyte material including the constituent unit (A1) containing an ionic group and the constituent unit (A2) substantially not containing an ionic group, wherein a phase separation structure is observed by a transmission electron microscope and a crystallization heat measured by differential scanning calorimetry is 0.1 J/g or more, or a phase separation structure is observed by a transmission electron microscope and the degree of crystallinity measured by wide angle X-ray diffraction is 0.5% or more, the polymer electrolyte material not only has excellent proton conductivity and fuel barrier properties, but also can achieve resistance to solvents, high strength, high toughness and a long-term durability through stabilization of a polymer higher-order structure, and can solve these problems at once.

In the polymer electrolyte material of the present invention, it is necessary that a phase separation structure is observed by a transmission electron microscope. The polymer electrolyte material is characterized by having excellent proton conductivity even under the conditions of a low humidity or a low temperature by controlling the phase separation structure of the polymer electrolyte material, namely, an aggregation state of the constituent unit (A1) containing an ionic group and the constituent unit (A2) substantially not containing an ionic group and a configuration of the aggregation. The phase separation structure can be analyzed visually or with such as a scanning electron microscope (SEM), a transmission electron microscope (TEM) and an atomic force microscope (AFM), but in the present invention, the presence or absence of the phase separation structure is determined by a transmission electron microscope (TEM).

Particularly, in the present invention, in order to clearly identify the aggregation state of the constituent unit (A1) containing an ionic group and the constituent unit (A2) substantially not containing an ionic group, the polymer electrolyte material is observed by TEM after an ionic group of the polymer electrolyte material is ion-exchanged with cesium by immersing the polymer electrolyte material in a 10 wt % ethanol solution of cesium acetate.

In the present invention, "A phase separation structure is observed" is defined as a state in which a phase separation structure is observed when TEM observations is carried out at 50000-fold magnification and an average interlaminar distance or an average distance between particles measured by image processing is 8 nm or more. An upper limit of the average interlaminar distance or the average distance between particles is not particularly limited, but 5000 nm or less is a practical value in view of a balance between the distance and mechanical properties. Particularly, the average interlaminar distance or the average distance between particles is more preferably 10 nm or more and 2000 nm or less, and most preferably 15 nm or more and 200 nm or less. When the phase separation structure is not observed by a transmission electron microscope or the average interlaminar distance or the average distance between particles is less than 8 nm, it is not preferable since the continuity of an ionic channel may be deficient and ionic conductivity may be low. Further, when the average interlaminar distance is more than 5000 nm, it is not preferable since mechanical strength or dimensional stability may become poor.

Further, the phase separation structure more preferably has anisotropy in which a direction of a membrane thickness is longer than a direction of a membrane surface from the viewpoint of ionic conductivity. The anisotropy is preferably two times or more and more preferably three times or more. Further, from the viewpoint of constructing a proton conductive path, the phase separation structure furthermore preferably has a bicontinuous structure in which a constituent component containing an ionic group continues in a direction of a membrane thickness.

Observations of the phase separation structure of such polymer electrolyte materials by TEM is carried out by a method described in Examples.

Since the polymer electrolyte material of the present invention is characterized by having crystallization capacity while having the phase separation structure, it is necessary that crystallinity is identified by differential scanning calorimetry (DSC) or wide angle X-ray diffraction. Namely, one aspect of the polymer electrolyte material of the present invention is a polymer electrolyte material in which a crystallization heat measured by differential scanning calorimetry is 0.1 J/g or more (hereinafter, may be referred to as an aspect A), and the other aspect is a polymer electrolyte material in which the degree of crystallinity measured by wide angle X-ray diffraction is 0.5% or more (hereinafter, may be referred to as an aspect B). In the present invention, both of the aspect A and the aspect B are preferable aspects, but particularly, the aspect A is more preferable from the viewpoint of high toughness and durability.

In the present invention, "a polymer has crystallinity" means that the polymer can be crystallized on heating temperature, has a crystallization capacity, or has already been crystallized. Also, the amorphous polymer means a polymer which is not a crystalline polymer, in which crystallization does not substantially proceed. Accordingly, even a crystalline polymer can be in an amorphous state as a polymer state when crystallization does not adequately proceed.

First, the aspect A of the polymer electrolyte material of the present invention will be described. In the aspect A of the polymer electrolyte material of the present invention, it is necessary that the crystallization heat $\Delta H$ per unit weight (g) of a dried polymer as measured by differential scanning calorimetry (DSC) is 0.1 J/g or more. As the differential scanning calorimetry (DSC), temperature modulation DSC can be more preferably used in point of measuring accuracy. Particularly, it is more preferable from the viewpoint of mechanical strength, long-term durability, resistance to hot methanol and fuel barrier properties that $\Delta H$ is 2 J/g or more. Particularly, $\Delta H$ is more preferably 5 J/g or more, still more preferably 10 J/g or more, and most preferably 15 J/g or more. The upper limit of $\Delta H$ is not specifically limited, but is practically 500 J/g or less.

Here, a method for measuring crystallinity by differential scanning calorimetry (DSC) will be described. Since a chemical structure and a higher order structure (crystal and amorphous state) of the polymer varies as a result of crystallization, melting and thermal decomposition of the polymer, the crystallinity of the polymer electrolyte material of the present invention is evaluated type on whether a crystallization temperature is recognized in a first heating in the differential scanning calorimetry or not and an area of the crystallization peak in heat flow-temperature chart of DSC. That is, in the aspect A of the polymer electrolyte material of the present invention, it is necessary that a crystallization temperature is recognized in the first heating and $\Delta H$ is 0.1 J/g or more in the differential scanning calorimetry.

In case the polymer is thermally decomposed, after preliminarily confirming a thermal decomposition temperature of the polymer by thermogravimetry/differential thermal (TG-DTA), the presence or absence of a crystallization temperature is confirmed during heating the temperature which is the thermal decomposition temperature or lower. In case a crystallization temperature is recognized at the temperature which is the thermal decomposition temperature or higher, there is a possibility that the chemical structure of the polymer varies, and therefore it cannot be decided that the polymer had crystallization capacity.

The polymer electrolyte material, in which a crystallization temperature is recognized in the first heating in the differential scanning calorimetry, means that it has crystallization capacity. In a polymer electrolyte material composed of an amorphous polymer, the crystallization temperature is not recognized in the differential scanning calorimetry. As the polymer electrolyte material of the present invention, the aspect A having an amorphous moiety, in which crystallization proceeds through heating, is a preferable example. There may be cases where by leaving the amorphous moiety in which crystallization proceeds through heating, the polymer electrolyte material not only has excellent proton conductivity and fuel barrier properties, but also can achieve extremely excellent resistance to solvents, mechanical strength and physical durability.

Confirmation of the presence or absence of crystallization temperature and measurement of crystallization heat of such an ionic group-containing block copolymer by temperature modulation DSC is performed by a method described in Examples. A thermal decomposition temperature is preferably confirmed separately by thermogravimetry/differential thermal or the like.

The crystallization temperature is recognized in an irreversible process and is recognized at a temperature of a glass transition temperature or higher and a melting temperature or lower as a temperature. Crystallization heat can be calculated from the area of the crystallization peak in heatflow-temperature chart of DSC. In case of a polymer electrolyte material having a sulfonic acid group, the crystallization temperature is close to a thermal decomposition temperature or a melting temperature and the high temperature of the crystallization temperature may be influenced by decomposition or melting. Therefore, in the present invention, the value, which is obtained by doubling heat from the low temperature to a peak top, is defined as crystallization heat.

Next, the aspect B of the polymer electrolyte material of the present invention will be described. In the aspect B of the polymer electrolyte material of the present invention, it is necessary that the degree of crystallinity measured by wide angle X-ray diffraction is 0.5% or more. A degree of crystallinity of the polymer electrolyte material of the present invention can be evaluated by the crystallinity measured by wide angle X-ray diffraction, and particularly, from the viewpoint of dimensional stability, mechanical strength and long-term durability, the degree of crystallinity is more preferably 3% or more, and furthermore preferably 5% or more. The upper limit of the degree of crystallinity is not particularly limited, but is practically 50% or less. When the degree of crystallinity is less than 0.5% and the crystallization heat measured by DSC is less than 0.1 J/g, it is not preferred because a polymer is amorphous, dimensional stability may be insufficient because of unstable structure and long-term durability may be insufficient because of insufficient toughness.

The case where the crystallization temperature is not recognized in the first heating in the differential scanning calorimetry can be separated specifically into the case where the polymer is amorphous without having crystallinity and the case where the polymer has already been crystallized. The polymer electrolyte material already crystallized becomes the aspect B of the polymer electrolyte material of the present invention and exhibits the degree of crystallinity, measured by wide angle X-ray diffraction, of 0.5% or more. However, in a polymer electrolyte material composed of an amorphous polymer, it is impossible to attain sufficient dimensional stability, mechanical strength, physical durability, fuel barrier properties and resistance to solvents because its structure is unstable, and it is impossible to achieve a high energy capacity or long-term durability in using the polymer electrolyte material in the fuel cell.

The measurement of the degree of crystallinity by wide angle X-ray diffraction of such polymer electrolyte materials is performed by a method described in Examples.

Preferable examples of the polymer electrolyte material of the present invention, whose phase separation structure is observed by TEM, include such as a block copolymer composed of a block (B1) containing an ionic group and a block (B2) substantially not containing an ionic group, a polymer alloy or a polymer mixture composed of a polymer containing an ionic group and a polymer substantially not containing an ionic group, and a polymer containing an ionic group in either a main chain or a side chain, but the polymer electrolyte material can be used without being limited to these.

Among these polymers, a block copolymer composed of a block (B1) containing an ionic group and a block (B2) substantially not containing an ionic group is more preferable as the polymer electrolyte material of the present invention, and a ratio W1/W2 of a molar amount W1 of the B1 to a molar amount W2 of the B2 is more preferably 0.2 or more and 5 or less from the viewpoint of a balance between proton conductivity and mechanical properties or durability, furthermore preferably 0.25 or more and 4 or less, and most preferably 0.33 or more and 3 or less. When the ratio W1/W2 is less than 0.2 or more than 5, it is not preferable because an effect as a block copolymer becomes insufficient and the block copolymer become deficient in proton conductivity, dimensional stability or mechanical properties.

In addition, in the present invention, it is stated that the block (B2) does not substantially contain an ionic group, but the block (B2) may contain a small amount of ionic groups within a range which does not affect adversely an effect of the present invention, particularly crystallinity.

In the present invention, the block copolymer refers to a block copolymer composed of two or more kinds of blocks. Also, the block in the present invention is a partial structure of the block copolymer, and comprises one kind of a repeating unit or a combination of a plurality kinds of repeating units, and refers to those having a formula weight of 2000 or more. Furthermore, the domain means a cluster made of aggregation of similar blocks in one or a plurality of polymer chains.

Examples of the ionic group-containing block copolymer to be used for the present invention include such as a block copolymer formed by reacting an ionic group-containing monomer and a monomer not containing an ionic group separately to form an ionic group-containing block and/or a block not containing an ionic group and then reacting these blocks, a block copolymer formed by reacting an ionic group-containing monomer and a polymer not containing an ionic group, a block copolymer formed by reacting a monomer not containing an ionic group and an ionic group-containing polymer, and furthermore a block copolymer formed by forming a block taking advantage of the difference in reactivity between monomers. Further, it is also possible that after obtaining a block copolymer having different reactivities, an ionic group is selectively introduced into only a highly reactive site.

When two or more kinds of block chains which are immiscible with one another, namely, a block copolymer, in which a block (B1) containing an ionic group and a block (B2) substantially not containing an ionic group form one polymer chain linked by a covalent bond, is employed, it is possible to control an arrangement of chemically different components on a nanoscale to a microscale. In the block copolymer, by short-range interaction generated from the incompatibility between chemically different blocks, the copolymer is phase separated into regions (nanometer scaled (nano order) structure) comprising each block chain but each microdomain is arranged keeping a specific order by virtue of long-range interaction generated from a covalent bond between block chains. A structure created by aggregation of microdomains comprising each block chain is referred to as a microphase separation structure.

A channel structure formed in a membrane by an ionically conductive component is thought to be extremely important for ionic conduction. From the view that ions are transferred through a channel, a spatial arrangement of an ionic conduction site in the membrane becomes important. It is one of the objects of the present invention to attain a polymer electrolyte membrane exhibiting excellent ionic conductivity by controlling the spatial arrangement of an ionic conduction site in the membrane.

By adjusting a block length, a packing property, polarity, rigidity and hydrophilicity/hydrophobicity of the ionic group-containing block copolymer used for the present invention, it is possible to control the processability of the polymer electrolyte material and the polymer electrolyte form article composed thereof, a size of the domain, crystallinity/noncrystallinity and fuel crossover, durability, resistance to solvents and mechanical characteristics.

However, when conventional aromatic polyethersulfone block copolymer or aromatic polyetherketone block copolymer is used as a polymer electrolyte material, there were a problem that if a content of the ionic group of the block copolymer is increased in order to enhance the proton conductivity under the conditions of a low humidity or a low temperature, a membrane swells significantly because of the aggregation of ionic groups and therefore fuel crossover such as methanol or the like is large, and a problem that since the polymer electrolyte material is low in a cohesive force of polymer chains, stability of a polymer higher-order structure is insufficient and dimensional stability of a membrane, mechanical strength and physical durability are insufficient.

Further, the ionic group-containing block copolymer, in which similar blocks aggregate to form a domain, could not be used as a polymer electrolyte material because processability becomes poor if a crystalline block exists.

On the other hand, the polymer electrolyte material of the present invention could control noncrystallinity/crystallinity through introduction of a protective group/deprotection, enhance the stability of a higher-order structure of the polymer electrolyte material through a pseudo-crosslinking effect by imparting crystallinity to the ionic group-containing block copolymer to be used, and achieve excellent dimensional stability, fuel barrier properties, mechanical strength and physical durability while having excellent proton conductivity under the conditions of a low humidity or a low temperature. That is, the domain formed by aggregation of the block (B1) containing an ionic group plays a role of enhancing proton conductivity and the domain formed by aggregation of the block (B2) substantially not containing an ionic group plays a role of enhancing performance of dimensional stability, fuel barrier properties, mechanical strength and long-term durability by a pseudo-crosslinking effect by crystal. That is, the present invention forms a phase separation structure by blocking the sites having different functions of ionic conductivity and crystallinity. The ionically-conductive block exhibits excellent proton conductivity by constructing an ionically-conductive path, and the crystalline block forms a crystal structure which is more robust than a random copolymer, and by this functional separation, the present invention achieves compatibility between a power generating property and durability.

Next, the ionic group-containing block copolymer used in the polymer electrolyte material of the present invention will be described specifically. The ionic group-containing block copolymer used for the present invention is more preferably a hydrocarbon-type polymer from the viewpoint of crystallinity and mechanical strength. An ionic group-containing hydrocarbon-type polymer referred to in the present invention means a polymer having an ionic group other than a perfluoro-type polymer.

As used herein, a perfluoro-type polymer refers to a polymer in which most of or all of hydrogen of alkyl groups and/or alkylene groups in the polymer are substituted with a fluorine. In the present specification, a polymer, in which 85% or more of hydrogen of alkyl groups and/or alkylene groups are substituted with a fluorine, is defined as a perfluoro-type polymer.

Typical examples of a perfluoro-type polymer having an ionic group of the present invention include commercialized products such as NAFION® manufactured by DuPont Co., Flemion® manufactured by Asahi Glass Co., Ltd. and Aciplex® manufactured by Asahikasei Corporation. Structures of these perfluoro-type polymers having such an ionic group can be represented by the following formula (N1):

[Chemical Formula 1]

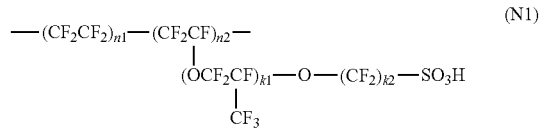

(N1)

In the formula (N1), n1 and n2 each independently represents a natural number; and k1 and k2 each independently represents an integer of 0 to 5.

In these perfluoro-type polymers having an ionic group, since a hydrophobic moiety and a hydrophilic moiety in the polymer forma define phase structure, a channel of water referred to as a cluster is formed in the polymer in a state of containing water. In this channel of water, fuel such as methanol readily moves, and therefore, it cannot be expected to reduce fuel crossover. Further, crystallinity is not recognized because of a bulky side chain and therefore it is not preferable.

The ionic group-containing block copolymer to be used for the present invention is more preferably a polymer having an aromatic ring in a main chain among hydrocarbon-type polymers from the viewpoint of mechanical strength, physical durability and chemical stability. That is, a polymer having an aromatic ring in a main chain, which has an ionic group, is more preferable. A structure of the main chain is not particularly limited as long as it has an aromatic ring in a main chain, and for example, those having sufficient mechanical strength and physical durability, which are used as an engineering plastic, are preferable.

Specific examples of the polymer having an aromatic ring in a main chain to be used for an ionic group-containing block copolymer include polymers containing at least one of constituent components such as polysulfone, polyethersulfone, polyphenylene oxide, polyarylene ether-type polymer, polyphenylene sulfide, polyphenylene sulfide sulfone, polyparaphenylene, polyarylene-type polymer, polyaryleneketone, polyether ketone, polyarylene phosphinoxide, polyether phosphinoxide, polybenzoxazole, polybenzthiazole, polybenzimidazole, polyamide, polyimide, polyetherimide and polyimidesulfone.

As used herein, polysulfone, polyethersulfone and polyether ketone are generic names of polymers having a sulfone bond and an ether bond and a ketone bond in the molecular chain and include, for example, polyether ketoneketone, polyetherether ketone, polyetherether ketoneketone, polyether ketone ether ketoneketone, and polyether ketone sulfone, but it is not intended to limit a specific polymer structure.

Among the above polymers having an aromatic ring in a main chain, polymers such as polysulfone, polyethersulfone, polyphenylene oxide, polyarylene ether-type polymer, polyphenylene sulfide, polyphenylene sulfide sulfone, polyarylene ketone, polyether ketone, polyarylene phosphinoxide, and polyether phosphinoxide are preferable in view of mechanical strength, physical durability, processability and resistance to hydrolysis.

Specific examples thereof include polymers containing an aromatic ring in a main chain, which have a repeating unit represented by the following general formula (T1):

[Chemical Formula 2]

(T1)

Wherein $Z^1$ and $Z^2$ represent an organic group containing an aromatic ring and each of $Z^1$ and $Z^2$ may represent two or more kinds of groups, and at least a portion of at least one kind of $Z^1$ and $Z^2$ has an ionic group; $Y^1$ represents an electron-withdrawing group; $Y^2$ represents oxygen or sulfur; and a and b each independently represents 0 or a positive integer, provided that a and b does not simultaneously represent 0.

Among the polymer comprising a repeating unit represented by the general formula (T1), which has an aromatic ring in a main chain, a polymer comprising repeating units represented by the general formulas (T1-1) to (T1-6) is more preferable in view of resistance to hydrolysis, mechanical strength, physical durability and production cost. Among the polymers comprising these repeating units, in view of mechanical strength, physical durability and production cost, an aromatic polyether-type polymer in which $Y^2$ is O is more preferable, and a polymer comprising a repeating unit represented by the general formula (T1-3), namely, an aromatic polyether ketone-type polymer, in which $Y^1$ is a —CO— group and $Y^2$ is O, is most preferable.

[Chemical Formula 3]

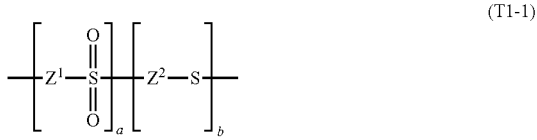

(T1-1)

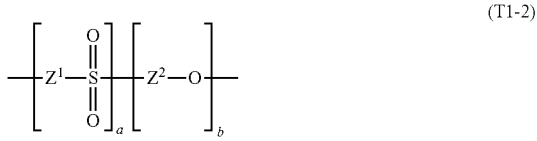

(T1-2)

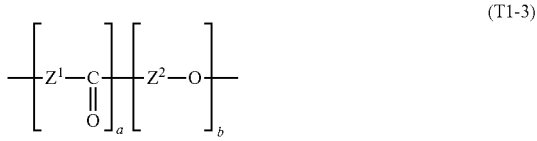

(T1-3)

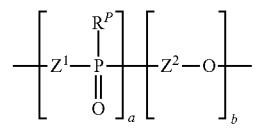

(T1-4)

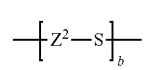

(T1-5)

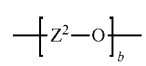

(T1-6)

Wherein $Z^1$ and $Z^2$ represent an organic group containing an aromatic ring and each of $Z^1$ and $Z^2$ may represent two or more kinds of groups, and at least a portion of at least one kind of $Z^1$ and $Z^2$ has an ionic group; and a and b each independently represents 0 or a positive integer, provided that a and b does not simultaneously represent 0.

An organic group as $Z^1$ and $Z^2$ is preferably a phenylene group, a naphthylene group, or a biphenylene group. These groups include a group containing an ionic group. Further, these groups may be substituted with a group other than the ionic group, but nonsubstituted groups are more preferable in point of imparting crystallinity. $Z^1$ and $Z^2$ are furthermore preferably a phenylene group and a phenylene group having an ionic group, and most preferably a p-phenylene group and a p-phenylene group having an ionic group.

Preferable examples of the organic group represented by $R^p$ in the general formula (T1-4) are a methyl group, an ethyl group, a propyl group, an isopropyl group, a cyclopentyl group, a cyclohexyl group, a norbornyl group, a vinyl group, an allyl group, a benzyl group, a phenyl group, a naphthyl group, and a phenylphenyl group. In view of industrial availability, $R^p$ is most preferably a phenyl group.

In the present invention, the aromatic polyether type polymer refers to a polymer which includes ether bonds as a form to bond, with aromatic ring units to one another in a polymer mainly composed of aromatic rings. The examples of chemical bonding such as a direct bond, ketone, sulfone, sulfide, various alkylenes, imide, amide, ester and urethane, which are commonly used for forming an aromatic polymer, may exist in addition to the ether bond. It is preferred that one or more ether bonds exist per repeating unit of a principal constituent component. The aromatic ring may include, in addition to the hydrocarbon-type aromatic ring, a hetero ring. Also, an aliphatic unit may partially constitute the polymer, along with the aromatic ring unit. The aromatic unit may have optional substituents, for example, a hydrocarbon-type group such as alkyl group, a halogen group, a nitro group, a cyano group, an amino group, a halogenated alkyl group, a carboxyl group, a phosphonic acid group, and a hydroxyl group.

As used herein, the aromatic polyether ketone-type polymer is a generic name of a polymer having at least an ether group and a ketone group in the molecular chain and includes such as polyether ketone, polyether ketoneketone, polyetherether ketone, polyetherether ketoneketone, polyether ketone ether ketoneketone, polyether ketone sulfone, polyether ketone phosphine oxide, and polyether ketone nitrile, and is not limited to a specific polymer structure. The aromatic polyether ketone-type polymer containing phosphine oxide or nitrile in large quantity may have insufficient solubility in a solvent in the ionic group-containing polymer having a protective group, and the aromatic polyether ketone-type polymer containing sulfone in large quantity may have insufficient crystallinity, resistance to solvents such as resistance to hot methanol and resistance to hot water.

Next, preferable examples of the block (B2) substantially not containing the ionic group to be used in the polymer electrolyte material of the present invention will be exemplified specifically.

In the block (B2) to be used in the polymer electrolyte material of the present invention, an aromatic polyether ketone (PEK)-type polymer, namely, a polymer, which comprises a constituent unit represented by the following general formula (Q1) and does not substantially contain the ionic group, is particularly preferable in that it exhibits crystallinity because of its good packing and very strong intermolecular cohesive force, and has a property of being insoluble in a common solvent:

[Chemical Formula 4]

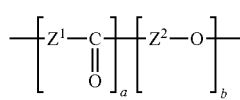

(Q1)

$Z^1$ and $Z^2$ in the general formula (Q1) represent a divalent organic group containing an aromatic ring and each of $Z^1$ and $Z^2$ may represent two or more kinds of groups but does not contain an ionic group; and a and b each independently represents a positive integer.

In the block (B2) to be used in the polymer electrolyte material of the present invention, a small amount of ionic group may be contained within a range which does not affect adversely an effect of the present invention, particularly crystallinity.

An organic group as $Z^1$ and $Z^2$ in the general formula (Q1) is more preferably a phenylene group for Z1 and at least one selected from the following general formulas (X-1), (X-2), (X-4) and (X-5) for Z2. Also, these groups may be substituted with a group other than the ionic group, but nonsubstituted groups are more preferable in point of imparting crystallinity. $Z^1$ and $Z^2$ are more preferably a phenylene group, and most preferably a p-phenylene group.

[Chemical Formula 5]

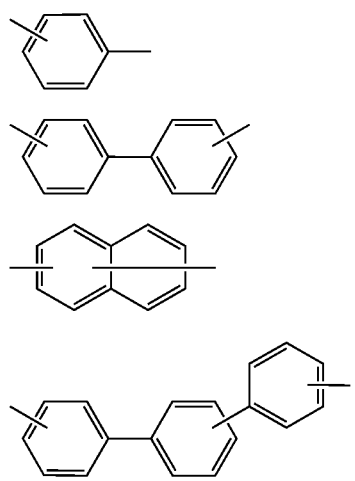

(X-1)

(X-2)

(X-4)

(X-5)

the groups represented by the general formula (X-1), (X-2), (X-4) or (X-5) may be optionally substituted with a group other than the ionic group.

Preferable specific examples of the constituent unit represented by the above general formula (Q1) include such as constituent units represented by the following general formulas (Q2) to (Q7), but it is not limited to these constituent units, and it can be appropriately selected in consideration of crystallinity or mechanical strength. Particularly, the constituent unit represented by the above general formula (Q1) is more preferably a constituent unit represented by the following general formulas (Q2), (Q3), (Q6) and (Q7), and most preferably the following general formulas (Q2) and (Q7) in point of crystallinity and production cost:

[Chemical Formula 6]

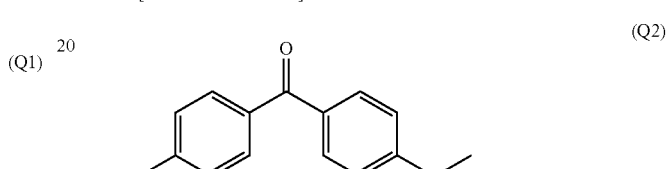

(Q2)

(Q3)

(Q4)

(Q5)

(Q6)

(Q7)

the general formulas (Q2) to (Q7) are all shown in the form of a bond at a para-position, but they may include the form of a bond at another position such as an ortho-position or a meta-position as long as they have crystallinity. However, the para-position is more preferable from the viewpoint of crystallinity.

Next, preferable examples of the block (B1) containing the ionic group to be used in the polymer electrolyte material of the present invention will be exemplified specifically. In the polymer electrolyte material of the present invention, the block (B1) has the ionic group to form a domain, and whereby, a polymer electrolyte material or a polymer electrolyte membrane can exhibit high proton conductivity in wide use conditions.

The ionic group to be used in the polymer electrolyte material of the present invention is preferably an atomic group having negative charge and a group having a proton exchange capability. As the functional group, a sulfonic acid group, a sulfoneimide group, a sulfuric acid group, phosphonic acid group, a phosphoric acid group, and a carboxylic acid group are preferably used. As used herein, the sulfonic acid group means a group represented by the following general formula (f1), the sulfoneimide group means a group represented by the following general formula (f2) [in the general formula, R means an atomic group], the sulfuric acid group represents a group represented by the following general formula (f3), the phosphonic acid group means a group represented by the following general formula (f4), the phosphoric acid group means a group represented by the following general formula (f5) or (f6), and the carboxylic, acid group means a group represented by the following general formula (f7).

[Chemical Formula 7]

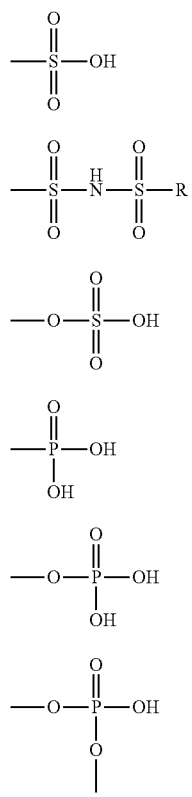

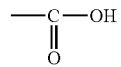

Such an ionic group includes the case where the functional groups (f1) to (f7) are in the form of a salt. Examples of the cation, which forms the salt, include any metal cation, and $NR_4^+$ (R is an any organic group). In case of a metal cation, its valence is not specifically limited and any metal cation can be used. Preferable specific examples of the metal ion include ions of Li, Na, K, Rh, Mg, Ca, Sr, Ti, Al, Fe, Pt, Ru, Ir, and Pd. Particularly, as the ionic group-containing block copolymer to be used for the present invention, Na, K, and Li, which are inexpensive and are easily capable of proton substitution, are preferably used.

Two or more kinds of these ionic groups can be contained in the polymer electrolyte material, and there may be cases where a combination of these ionic groups is more preferable. This combination is appropriately determined depending on a structure of a polymer. Among these ionic groups, it is more preferable to have at least a sulfonic acid group, a sulfoneimide group, and a sulfuric acid group in view of high proton conductivity, and it is most preferable to have at least a sulfonic acid group in view of resistance to hydrolysis.

When the polymer electrolyte material of the present invention has a sulfonic acid group, in view of proton conductivity and fuel barrier properties, the density of the sulfonic acid group thereof is preferably from 0.1 to 5.0 mmol/g, more preferably from 0.3 to 3 mmol/g, and most preferably from 0.5 to 2.5 mmol/g.

By setting the density of the sulfonic acid group at 0.1 mmol/g or more, conductivity, namely, output performance can be maintained, and by setting the density of the sulfonic acid group at 5 mmol/g or less, sufficient fuel barrier properties, wet mechanical strength and long-term durability can be obtained in case of using as an electrolyte membrane for a fuel cell.

Particularly, from the viewpoint of balance between proton conductivity and mechanical strength or long-term durability, more preferably, the density of the sulfonic acid group of the block (B1) containing an ionic group is 1.7 to 5.0 mmol/g and the density of the sulfonic acid group of the block (B2) substantially not containing an ionic group is 0 to 0.5 mmol/g. From the viewpoint of balance between proton conductivity and mechanical strength or long-term durability, the density of the sulfonic acid group of the block (B1) containing an ionic group is furthermore preferably 3.0 to 4.5 mmol/g, and most preferably 3.5 to 4.0 mmol/g. From the viewpoint of balance between proton conductivity and mechanical strength or long-term durability, the density of the sulfonic acid group of the block (B2) substantially not containing an ionic group is furthermore preferably 0 to 0.2 mmol/g, and most preferably 0 mmol/g.

When the density of the sulfonic acid group of the block (B1) containing an ionic group is less than 1.7 mmol/g or more than 5.0 mmol/g, it is not preferable because conductivity may be insufficient, or mechanical strength or dimensional stability may be deficient. Further, when the density of the sulfonic acid group of the block (B2) substantially not containing an ionic group is more than 0.5 mmol/g, it is not preferable because a phase separation structure becomes imprecise and conductivity may be deficient.

As used herein, the density of the sulfonic acid group is the number of mols of sulfonic acid groups introduced per unit dried weight of the polymer electrolyte material or the polymer electrolyte membrane, and as the value of the density increases, a degree of sulfonation increases. The density of the sulfonic acid group can be measured by elemental analysis or acid-base titration. Among these methods, it is preferable that the density is calculated from a S/C ratio using an elemental analysis method because of ease of the measurement. However, when the polymer electrolyte membrane contains a sulfur other than the sulfonic acid group, it is also possible to determine the ion-exchange capacity by a acid-base titration method. The polymer electrolyte material and the polymer electrolyte membrane of the present invention, as described later, include an aspect as a complex comprising an ionic group-containing block copolymer used for the present invention and other components, and in this case, the density of the sulfonic acid group is determined based on the total amount of the complex.

The procedure of the acid-base titration is carried out as follows. The measurement is carried out three or more times and the obtained values are averaged.
(1) A sample is ground by a mill and screened through a net sieve #50 and the particles passed through the net sieve is used as a measuring sample.
(2) A sample tube (with a cap) is weighed by precision balance.
(3) About 0.1 g of the sample obtained in (1) is put in the sample tube and vacuum-dried at 40° C. for 16 hours.
(4) The sample tube containing the sample was weighed to determine a dry weight of the sample.
(5) Sodium chloride is dissolved in an aqueous 30 wt % methanol solution to prepare a saturated saline.
(6) 25 mL of the saturated saline obtained in (5) is added to the sample, followed by ion exchange while stirring for 24 hours.
(7) Hydrochloric acid produced is titrated using an aqueous 0.02 mol/L sodium hydrate solution. As an indicator, two drops of a commercially available phenolphthalein solution for titration (0.1% by volume) are added and it is judged as the end point when the solution shows a reddish purple color.
(8) The density of the sulfonic acid group is determined by the following equation.

Density of sulfonic acid group (mmol/g)=[Concentration (mmol/ml) of aqueous sodium hydroxide solution×amount (ml) added dropwise]/Dry weight (g) of sample Examples of a method for introducing the ionic group in order to obtain these ionic group-containing block copolymers to be used for the present invention include a method of using a monomer having an ionic group to polymerize it, and a method of introducing an ionic group by a polymer reaction.

In the method of using a monomer having an ionic group to polymerize it, a monomer having an ionic group in a repeating unit may be used. Such a method is described in, for example, Journal of Membrane Science, 197, 2002, p. 231-242. This method can be easily applied to industries and very preferable since the density of the sulfonic acid group of a polymer can be easily controlled.

A example of the method of introducing an ionic group by a polymer reaction is described as follows. Introduction of a phosphonic acid group into an aromatic polymer can be performed by a method described in, for example, Polymer Preprints, Japan, 51, 2002, p. 750. Introduction of a phosphoric group into an aromatic polymer can be performed, for example, by phosphate esterifying an aromatic polymer having a hydroxyl group. Introduction of a carboxylic acid group into an aromatic polymer can be performed, for example, by oxidizing an aromatic polymer having an alkyl group or a hydroxyalkyl group. Introduction of a sulfate group into an aromatic polymer can be performed, for example, by sulfate esterifying an aromatic polymer having a hydroxyl group. As a method of sulfonating an aromatic polymer, namely, a method of introducing a sulfonic acid group, methods described in, for example, Japanese Unexamined Patent Publication (Kokai) No. 2-16126, and Japanese Unexamined Patent Publication (Kokai) No. 2-208322 are publicly known.

Specifically, the aromatic polymer can be sulfonated, for example, by reacting the aromatic polymer with a sulfonating agent like chlorosulfonic acid in a solvent such as chloroform, or by reacting the aromatic polymer in concentrated sulfuric acid or fuming sulfuric acid. The sulfonating agent is not particularly limited as long as it is an agent to sulfonate the aromatic polymer, and sulfur trioxide or the like can also be used in addition to the above sulfonating agent. When the aromatic polymer is sulfonated by this method, a degree of sulfonation can be easily controlled by an amount of the sulfonating agent to be used, a reaction temperature and a reaction time. Introduction of a sulfonimide group into the aromatic polymer can be performed, for example, by a method of reacting a sulfonic acid group with a sulfonamide group.

Next, a main chain structure of the block (B1) containing an ionic group to be used in the polymer electrolyte material of the present invention will be described specifically.

First, the method for synthesizing an aromatic polyether type polymer to be used for the present invention is not specifically limited as long as it is a method capable of substantially increasing a molecular weight. For example, the polymer can be synthesized by the aromatic nucleophilic substitution reaction of an aromatic active dihalide compound and a diphenolic compound, or the aromatic nucleophilic substitution reaction of a halogenated aromatic phenol compound. The aromatic active dihalide compound is not specifically limited as long as the molecular weight can be increased by the aromatic nucleophilic substitution reaction with the diphenolic compound.

It is preferred to use a monomer of a compound obtained by introducing an ionic group into an aromatic active dihalide compound as an aromatic active dihalide compound to be used for the block (B1) containing an ionic group from the viewpoint that the amount of the ionic group can be accurately controlled. Specific examples of the monomer having a sulfonic acid group as the ionic group include, but are not limited to, 3,3'-disulfonate-4,4'-dichlorodiphenylsulfone, 3,3'-disulfonate-4,4'-difluorodiphenylsulfone, 3,3'-disulfonate-4,4'-dichlorodiphenylketone, 3,3'-disulfonate-4,4'-difluorodiphenylketone, 3,3'-disulfonate-4,4'-dichlorodiphenylphenylphosphine oxide, and 3,3'-disulfonate-4,4'-difluorodiphenylphenylphosphine oxide.

From the viewpoint of proton conductivity and resistance to hydrolysis, as the ionic group, a sulfonic acid group is most preferable, but the monomer having an ionic group used for the present invention may have another ionic group. Among these monomers, 3,3'-disulfonate-4,4'-dichlorodiphenylketone and 3,3'-disulfonate-4,4'-difluorodiphenylketone are more preferable in view of resistance to hot methanol and inhibitory effect of fuel crossover, and 3,3'-disulfonate-4,4'-difluorodiphenylketone is most preferably in view of polymerization activity.

A polymer electrolyte material synthesized by use of 3,3'-disulfonate-4,4'-dichlorodiphenylketone and 3,3'-disulfonate-4,4'-difluorodiphenylketone as a monomer having an ionic group further contains a constituent unit represented by the following general formula (p1) and is preferably employed. This aromatic polyether-type polymer is more preferably used because it becomes a component which is more excellent in resistance to hot methanol than a sulfonic acid group in addition to a characteristic of high crystallinity of a ketone group, and becomes a component useful for a material excellent in dimensional stability, mechanical strength and physical durability at elevated temperature in methanol water used as a fuel. In case of the polymerization, a sulfonic acid group is preferably combined with a monovalent cation species to form a salt. Examples of the monovalent cation species include sodium, potassium or other metal species, and various amines cation species, and it is not limited to these. These aromatic active dihalide compounds can be used alone or in combination.

[Chemical Formula 8]

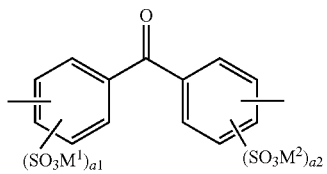

(p1)

In the general formula (p1), $M^1$ and $M^2$ represent hydrogen, a metal cation, or an ammonium cation, and a1 and a2 represent an integer of 1 to 4; and the constituent unit represented by the general formula (p1) may be optionally substituted.

Further, with respect to the aromatic active dihalide compound, it is also possible to control the density of an ionic group by copolymerizing a compound having an ionic group with a compound not having an ionic group. However, it is more preferable for the block (B1) having an ionic group of the present invention that an aromatic active dihalide compound not having an ionic group is not copolymerized from the viewpoint of securing continuity of a proton conduction path.

Preferred specific examples of the aromatic active dihalide compound not having an ionic group include 4,4'-dichlorodiphenylsulfone, 4,4'-difluorodiphenylsulfone, 4,4'-dichlorodiphenylketone, 4,4'-difluorodiphenylketone, 4,4'-dichlorodiphenylphenylphosphine oxide, 4,4'-difluorodiphenylphenylphosphine oxide, 2,6-dichlorobenzonitrile, and 2,6-difluorobenzonitrile. Among these dihalide compounds, 4,4'-dichlorodiphenylketone and 4,4'-difluorodiphenylketone are more preferable from the viewpoint of imparting crystallinity, mechanical strength and physical durability, resistance to hot methanol and inhibitory effect of fuel crossover, and 4,4'-difluorodiphenylketone are most preferable from the viewpoint of a polymerization activity. These aromatic active dihalide compounds can be used alone or in combination.

A polymer electrolyte material synthesized by use of 4,4'-dichlorodiphenylketone and 4,4'-difluorodiphenylketone as an aromatic active dihalide compound further contains a constituent unit represented by the following general formula (p2) and is preferably employed. This constituent unit is preferably used because it becomes a component to impart an intermolecular cohesive force and crystallinity, and becomes a component useful for a material excellent in dimensional stability, mechanical strength and physical durability at elevated temperature in methanol water used as a fuel and becomes a component useful for a material excellent in mechanical strength and durability in a polymer electrolyte fuel cell using hydrogen as a fuel.

[Chemical Formula 9]

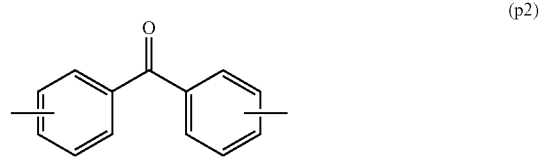

(p2)

the constituent unit represented by the general formula (p2) may be optionally substituted, but does not contain the ionic group.

Examples of the halogenated aromatic phenol compound is not also particularly limited, and include 4-hydroxy-4'-chlorobenzophenone, 4-hydroxy-4'-fluorobenzophenone, 4-hydroxy-4'-chlorodiphenylsulfone, 4-hydroxy-4'-fluorodiphenylsulfone, 4-(4'-hydroxybiphenyl)(4-chlorophenyl)sulfone, 4-(4'-hydroxybiphenyl) (4-fluorophenyl)sulfone, 4-(4'-hydroxybiphenyl) (4-chlorophenyl)ketone, and 4-(4'-hydroxybiphenyl)(4-fluorophenyl)ketone. These halogenated aromatic phenol compounds can be used alone or in combination. In the reaction of an activated dihalogenated aromatic compound and an aromatic dihydroxy compound, an aromatic polyether-type compound may be synthesized by reacting together with a halogenated aromatic phenol compound.

Examples of the block (B1) containing an ionic group to be used for the present invention is particularly preferably an aromatic polyetherketone-type copolymer comprising constituent units represented by the following general formulas (P1) and (P2) containing constituent units represented by the above general formulas (p1) and (p2):

[Chemical Formula 10]

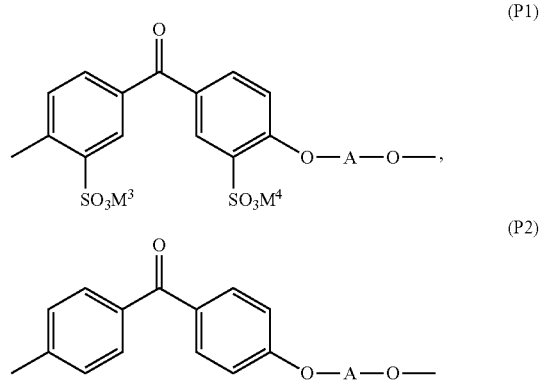

In the general formulas (P1) and (P2), A represents a divalent organic group containing an aromatic ring and $M^1$ and $M^2$ represent hydrogen, a metal cation, or an ammonium cation; and "A" in formula P2 may represent two or more kinds of groups.

By changing the composition ratio of constituent units represented by the general formulas (P1) and (P2), it is possible to control the density of a sulfonic acid group, but an amount of P1 to be introduced based on a total molar amount of P1 and P2 is preferably 50 mol % or more, more preferably 75 mol % or more, and most preferably 90 mol % or more. When the amount of P1 to be introduced is less than 50 mol %, construction of a proton conduction path becomes inadequate and it is not preferable.

Herein, as the divalent organic group A containing an aromatic ring in the general formulas (P1) and (P2), various diphenolic compounds, which can be used for polymerization of an aromatic polyether-type polymer by the aromatic nucleophilic substitution reaction, can be employed, and it is not particularly limited. It is also possible to use a compound obtained by introducing a sulfonic acid group into these aromatic dihydroxy compounds as a monomer.

Preferable specific examples of the divalent organic group A containing an aromatic ring include groups represented by the following general formulas (X-1) to (X-29):

[Chemical Formula 11]

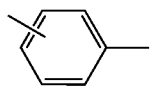
(X-1)

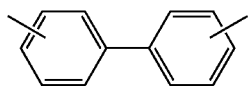
(X-2)

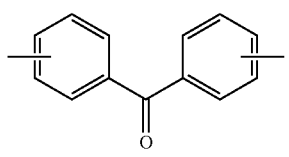
(X-3)

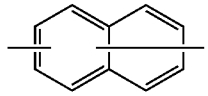
(X-4)

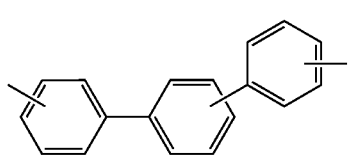
(X-5)

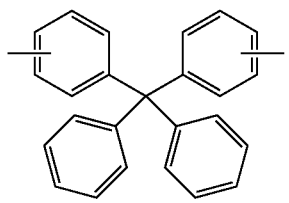
(X-6)

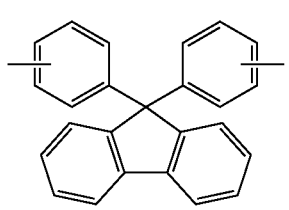
(X-7)

Wherein the group represented by the formulas (X-1) to (X-7) may be optionally substituted.

[Chemical Formula 12]

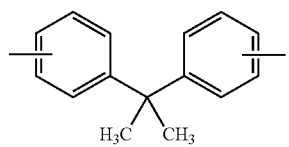
(X-8)

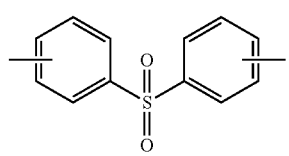
(X-9)

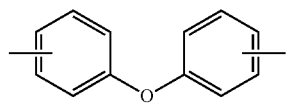
(X-10)

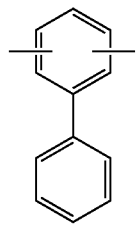
(X-11)

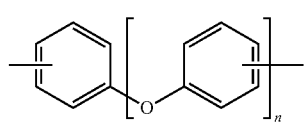
(X-12)

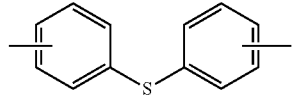
(X-13)

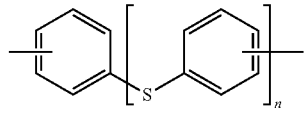
(X-14)

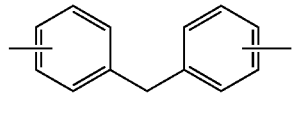
(X-15)

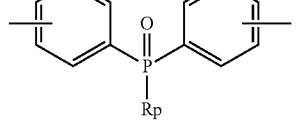
(X-16)

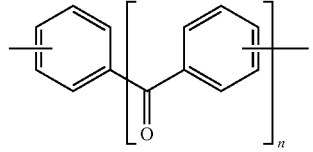
(X-17)

(X-18)
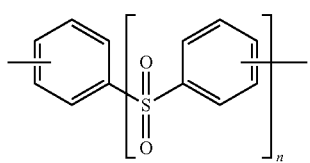

(X-19)
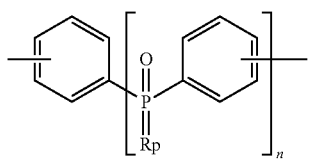

(X-20)
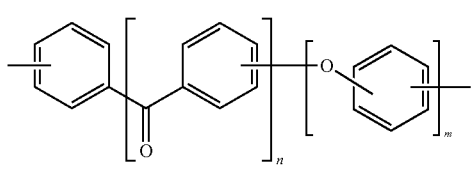

Wherein n and m represent an integer of 1 or more, and Rp represents an optional organic group.

[Chemical Formula 13]

(X-21)
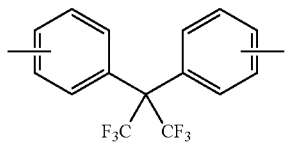

(X-22)
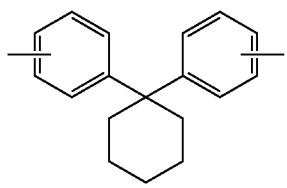

(X-23)
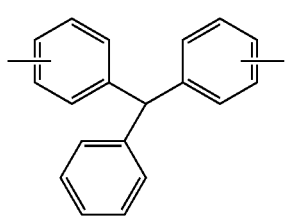

(X-24)
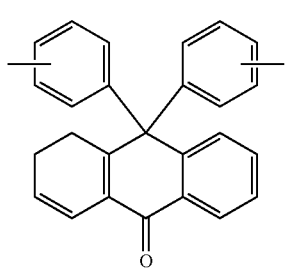

(X-25)
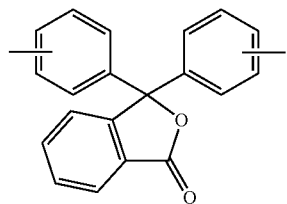

(X-26)
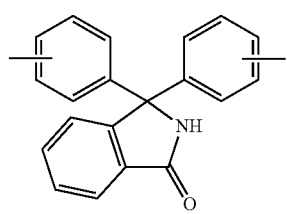

(X-27)
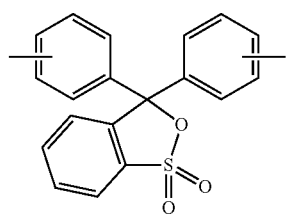

(X-28)
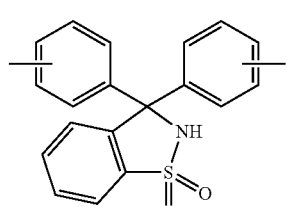

(X-29)
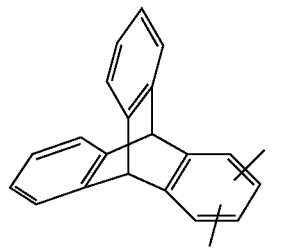

These may have a substituent and an ionic group. A divalent organic group A having an aromatic ring in the side chain is also preferable example. These can be used in combination, if necessary.

Among these groups, from the viewpoint of crystallinity, dimensional stability and mechanical strength, groups represented by the general formulas (X-1) to (X-7) are more preferable, groups represented by the general formulas (X-1) to (X-5) are furthermore preferable, and a group represented by the general formula (X-2) or (X-3) is most preferable.

The polymer electrolyte material of the present invention is suitably used for the polymer electrolyte form article. In the present invention, the polymer electrolyte form article means a form article containing the polymer electrolyte material of the present invention.

The polymer electrolyte form article in the present invention can take various forms such as membrane (including film and film-shaped article), plate-like, fiber-like, hollow fiber-like, particle-like, bulk-like, microporous-like, coatings, foams and the like according to the purposes. It can be adapted to wide use because it can improve design flexibility of a polymer and various characteristics such as mechanical properties and resistance to a solvent. Particularly, the polymer electrolyte form article is preferable in a membrane form.

When the polymer electrolyte material of the present invention is used as fuel cell, the material is preferably used for the polymer electrolyte membrane and the electrocatalyst layer. Particularly, the material is preferably used for the polymer electrolyte membrane. The reason for this is that in case of using the material as fuel cell, the material is usually used as the polymer electrolyte membrane or a binder of the electrocatalyst layer in a membrane state.

The polymer electrolyte membrane of the present invention can be applied to various purposes. For example, the polymer electrolyte membrane can be applied to medical purposes such as extracorporeal circulation column and artificial skin, purposes for filtration, purposes for ion exchange resin such as chlorine-tolerant reverse osmosis membrane, purposes for various structural materials, electrochemical purposes, humidifying membranes, antifogging membranes, antistatic membranes, membranes for solar cell, and gas barrier materials. Moreover, the polymer electrolyte membrane is suited for artificial muscle and actuator materials. Among these purposes, the polymer electrolyte material or the polymer electrolyte form article can be more preferably used for various electrochemical purposes. The electrochemical purposes include, for example, a fuel cell, a redox flow cell, a water electrolysis apparatus, and a chloroalkali electrolysis apparatus. Among these purposes, a fuel cell is most preferable.

Next, a production method for obtaining the polymer electrolyte form article of the present invention is described as follows.

Conventional ionic group-containing block copolymers were all amorphous polymers because they have a bulky ionic group such as a sulfonic acid group and due to the synthetic constraint that solubility in a solvent is required in polymerization or in forming a membrane. Since these amorphous ionic group-containing block copolymer is low in a cohesive force of a polymer chain, they are deficient in toughness or stability of a polymer higher-order structure and could not achieve sufficient mechanical strength and physical durability when being formed into the form of membrane. Further, since a thermal decomposition temperature of the ionic group is lower than a melting point, melt processing is difficult and solution casting method is usually employed, and therefore an uniform and tough membrane could not be obtained in a polymer containing a crystal insoluble in a solvent.

The polymer electrolyte form article of the present invention is a polymer electrolyte material composed of an ionic group-containing block copolymer having a block (B1) containing an ionic group and a block (B2) substantially not containing an ionic group, in which a ratio W1/W2 of weight W1 of the B1 to weight W2 of the B2 is 0.2 or more and 5 or less, and it is obtained by forming a polymer electrolyte material in which protecting groups are introduced into at least a block (B2), and then deprotecting at least a portion of the protective groups contained in the form article.

When the block (B2) substantially not containing an ionic group is crystalline, since processability tends to become poor due to crystallization of a polymer by domain formation compare with the case where a random copolymer is used, it is preferred to improve the processability by introducing protective groups into at least the block (B2). Also with respect to the block (B1) containing an ionic group, it is preferred to introduce protective groups when the processability becomes poor.

Specific examples of the protective group to be used for the present invention include a protective group used commonly in organic synthesis, and the protective group is a substituent temporarily introduced on the assumption that it is removed in the following stages, which protects a functional group having high reactivity and makes the functional group inert for a subsequent reaction, and can deprotect the functional group after the reaction to return to an original functional group. That is, the protective group is a group paired with a functional group to be protected, and examples thereof include the case where a t-butyl group is used as a protective group of a hydroxyl group, but the case where a t-butyl group is introduced into an alkylene chain is not referred to as a protective group. The reaction for introducing a protective group is referred to as a protection (reaction), while the reaction for removing a protective group is referred to as a deprotection (reaction).

Such a protection reaction is described in detail, for example, in Theodora W. Greene, "Protective Groups in Organic Synthesis", U.S.A., John Wiley & Sons, Inc, 1981, and the protection reaction can be preferably used. The protective group can be appropriately selected taking account of reactivity and yield of the protection reaction and deprotection reaction, stability of protective group-containing state, and production cost. The stage, at which the protective group is introduced in the polymerization reaction, may be a monomer, an oligomer or a polymer, and can be appropriately selected.

Specific examples of the protection reaction include a method for protecting/deprotecting a ketone group with a ketal group, and a method for protecting/deprotecting a ketone group with a heteroatom analog of a ketone group, for example, thioketal. These methods are described in Chapter 4 of aforementioned "Protective Groups in Organic Synthesis". Examples thereof further include a method for protection/deprotection between sulfonic acid and a soluble ester derivative, and a protection method of introducing a t-butyl group into an aromatic ring and a deprotection method through de-t-butylation with an acid. However, the protection/deprotection is not limited to these, and any protection/deprotection can be preferably used as long as a group is a protective group. In view of improving solubility of the polymer in a common solvent, it is preferred to use, as the protective group, an aliphatic group having large steric hindrance, particularly an aliphatic group containing a cyclic moiety.

The position of the functional group, at which the protective group is introduced, is preferably a main chain of the polymer. In the polymer electrolyte material of the present invention, since the protective group is introduced into a polymer having good packing for the purpose of improving processability, sometimes an adequate effect of the present invention cannot be achieved even though the protective groups are introduced into the side chain of the polymer. As used herein, the functional group, which is present in the main chain of the polymer, is defined as a functional group in which a polymer chain is cleaved when the functional group is eliminated. For example, this means that if a ketone group of aromatic polyetherketone is eliminated, benzene rings are isolated from one another.

More preferable protection reaction are a method for protecting/deprotecting a ketone group with a ketal group, and a method for protecting/deprotecting a ketone group with a heteroatom analog of a ketone group, for example, thioketal in view of reactivity and stability. In the polymer electrolyte material and the polymer electrolyte membrane the present invention, a constituent unit containing a protective group is more preferably a constituent unit containing at least one selected from the following general formulas (P3) and (P4).

[Chemical Formula 14]

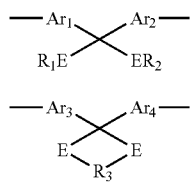

(P3)

(P4)

In the formulas (P3) and (P4), $Ar_1$ to $Ar_4$ represent an optional divalent arylene group, $R_1$ and $R_2$ represent a least one group selected from H and an alkyl group, $R_3$ represents an optional alkylene group, E represents O or S, and each group may represent two or more kinds of groups; and groups represented by the formulas (P3) and (P4) may be optionally substituted.

Particularly, E is O in the above general formulas (P3) and (P4) in view of smell, reactivity and stability of a compound, that is, a method for protecting/deprotecting a ketone group with a ketal group is most preferable.

$R_1$ and $R_2$ in the general formula (P3) are more preferably an alkyl group in view of stability, furthermore preferably an alkyl group having 1 to 6 carbon atoms, and most preferably an alkyl group having 1 to 3 carbon atoms. Further, $R_3$ in the general formula (P4) is more preferably an alkylene group having 1 to 7 carbon atoms in view of stability, and most preferably an alkylene group having 1 to 4 carbon atoms. Specific examples of $R_3$ include, but are not limited to, $-CH_2CH_2-$, $-CH(CH_3)CH_2-$, $-CH(CH_3)CH(CH_3)-$, $-C(CH_3)_2CH_2-$, $-C(CH_3)_2CH(CH_3)-$, $-C(CH_3)O(CH_3)_2-$, $-CH_2CH_2CH_2-$, and $-CH_2C(CH_3)_2CH_2-$.

The constituent unit having at least the general formula (P4) of the above constituent unit having the general formula (P3) or (P4) is preferably used from the viewpoint of stability such as resistance to hydrolysis. Furthermore, $R_3$ in the general formula (P4) is preferably an alkylene group having 1 to 7 carbon atoms, that is, a group represented by $C_{n1}H_{2n1}$ (n1 is an integer of 1 to 7), and most preferably at least one selected from $-CH_2CH_2-$, $-CH(CH_3)CH_2-$, or $-CH_2CH_2CH_2-$ in view of stability and ease of synthesis.

An organic group as $Ar_1$ to $Ar_4$ in the general formulas (P3) and (P4) is preferably a phenylene group, a naphthylene group, or a biphenyl group. These organic groups may be optionally substituted. As the aromatic polyether-type polymer of the present invention, in view of solubility and ease of availability, both $Ar_3$ and $Ar_4$ in the above general formula (P4) are more preferably a phenylene group, and both $Ar_3$ and $Ar_4$ are most preferably a p-phenylene group.

In the present invention, the method of protecting a ketone group with ketal includes a method of reacting a precursor compound having a ketone group with a monofunctional and/or difunctional alcohol in the presence of an acid catalyst. For example, it can be produced by reacting 4,4'-dihydroxybenzophenone which is a ketone precursor with monofunctional and/or difunctional alcohol in the presence of an acid catalyst such as hydrogen bromide in a solvent such as aliphatic or aromatic hydrocarbons. The alcohol is aliphatic alcohol having 1 to 20 carbon atoms. An improved method for producing a ketal monomer to be used for the present invention comprises reacting 4,4'-dihydroxybenzophenone which is a ketone precursor with difunctional alcohol in the presence of alkyl ortho ester and a solid catalyst.

In the present invention, a method in which at least a part of a ketone group protected with ketal is deprotected to form a ketone group is not particularly limited. The above deprotection reaction can be performed in the presence of water and acid under a nonuniform or uniform condition, but a method, in which an acid treatment is performed after forming a membrane, is more preferable from the viewpoint of mechanical strength, physical durability and resistance to solvents. Specifically, the formed membrane can be deprotected by immersing it in a hydrochloric acid aqueous solution or a sulfuric acid aqueous solution, and a concentration of acid or a temperature of the aqueous solution can be appropriately selected.

A weight ratio of the required acid aqueous solution to the polymer is preferably 1 to 100 times, but a larger amount of water can also be used. An acid catalyst is preferably used in a concentration of 0.1 to 50% by weight of water being present. Examples of preferable acid catalyst include a strong mineral acid such as hydrochloric acid, nitric acid, fluorosulfonic acid, or sulfuric acid, and a strong organic acid such as p-toluenesulfonic acid or trifluoromethanesulfonic acid. According to the membrane thickness of a polymer, the acid catalyst, an amount of excess water and a reaction pressure can be appropriately selected.

In case of a membrane having a thickness of 50 μm, it is possible to deprotect almost all of protective groups by immersing the membrane in an aqueous 6N hydrochloric acid solution and heating at 95° C. for 1 to 48 hours. It is also possible to deprotect almost all of protective groups by immersing the membrane in an aqueous 1N hydrochloric acid solution at 25° C. for 24 hours. However, the conditions of deprotection are not limited to these conditions and it is possible to deprotect with an acidic gas or an organic acid, or a heat treatment.

Also when the aromatic polyether-type polymer includes a bond form such as a direct bond other than an ether bond, a position of the protective group introduced is more preferably a portion of the aromatic ether-type polymer from the viewpoint of improving processability.

Specifically, the aromatic polyether-type polymer comprising constituent unit represented by the general formula (P3) or (P4) can be synthesized by using, as a diphenolic compound, a compound represented by the following general formulas (P3-1) and (P4-1), followed by the aromatic nucleophilic substitution reaction of the compound with an aromatic active dihalide compound. The constituent units represented by the general formulas (P3) and (P4) may be derived from either the diphenolic compound or the aromatic active dihalide compound, but are more preferably derived from the diphenolic compound taking account of reactivity of the monomer.

[Chemical Formula 15]

(P3-1)

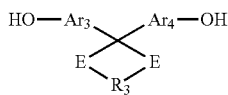
(P4-1)

In the general formulas (P3-1) and (P4-1), $Ar_1$ to $Ar_4$ represent an optional divalent arylene group, $R_1$ and $R_2$ represent at least one kind of a group selected from H and an alkyl group, $R_3$ represents an optional alkylene group, and E represents O or S; and the groups represented by the general formulas (P3-1) and (P4-1) may be optionally substituted.

Specific examples of particularly preferable diphenolic compound to be used for the present invention include compounds represented by the following general formulas (r1) to (r10), and derivatives derived from these diphenolic compounds.

[Chemical Formula 16]

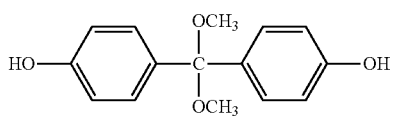 (r1)

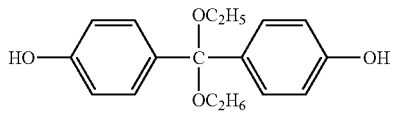 (r2)

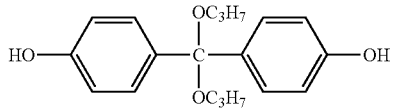 (r3)

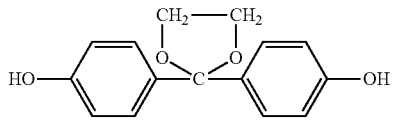 (r4)

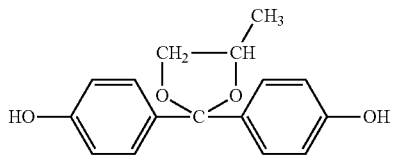 (r5)

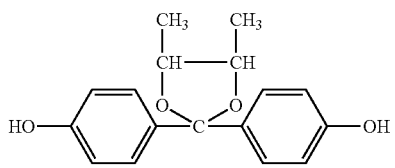 (r6)

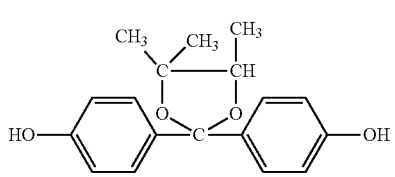 (r7)

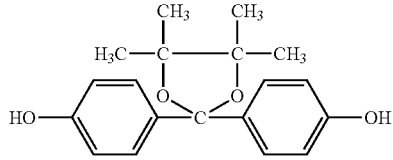 (r8)

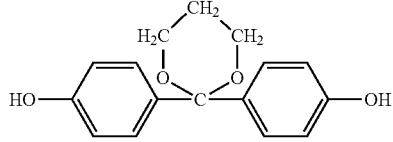 (r9)

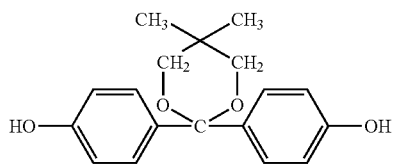 (r10)

Among these diphenolic compounds, compounds represented by the general formulas (r4) to (r10) are more preferable in view of stability, more preferably compounds represented by the general formulas (r4), (r5) and (r9), and most preferably a compound represented by the general formula (r4).

In the polymer electrolyte membrane of the present invention, the proton conductivity per unit area and per unit thickness is preferably 10 mS/cm or more, more preferably 20 mS/cm or more, and still more preferably 50 mS/cm or more. A sample of a membrane was immersed in pure water at 25° C. for 24 and taken out in an atmosphere at 25° C. and a relative humidity of 50 to 80%, and then proton conductivity was measured as quick as possible using a potentiostatic AC impedance method.

When proton conductivity per unit area and per unit thickness is 10 mS/cm or more, sufficient proton conductivity, namely, sufficient cell power can be obtained when the membrane is used as a polymer electrolyte membrane for fuel cell. The higher proton conductivity, the better. However, when proton conductivity is too high, the membrane having high proton conductivity is likely to be dissolved or collapsed by the fuel such as methanol water and also fuel crossover may increase. Therefore, actual upper limit is 5,000 mS/cm.

In the polymer electrolyte membrane of the present invention, methanol crossover per unit area and per unit thickness with respect to an aqueous 1 mol % methanol solution under the condition of 20° C. is 100 nmol/min/cm or less. Methanol crossover is more preferably 50 nmol/min/cm or less, and still more preferably 10 nm/Min/cm or less. The reason is as follows. That is, in the fuel using the membrane of the polymer electrolyte material, it is desired that fuel crossover is small so as to maintain high concentration of the fuel in view of obtaining high power and high energy capacity in the region of high concentration of the fuel. On the other hand, In view of ensuring proton conductivity, fuel crossover is more preferably 0.01 nmol/min/cm or more.

The proton conductivity per unit area, measured under the above conditions, is preferably 3 S/cm$^2$ or more, more preferably 5 S/cm$^2$ or more, and furthermore preferably 5 S/cm$^2$ or more. By adjusting proton conductivity per unit area to 3 S/cm$^2$ or more, a high-power fuel cell can be obtained. On the other hand, since the membrane having high proton conductivity is likely to be dissolved or collapsed by the fuel such as methanol water and its fuel crossover tends to increase. Therefore, actual upper limit of the proton conductivity is 500 S/cm$^2$.

In the polymer electrolyte membrane of the present invention, methanol crossover per unit area with respect to an aqueous 1 mol % methanol solution under the condition of 20° C. is preferably 5 μmol/min/cm$^2$ or less. The reason is as follows. That is, in the fuel using the membrane of the polymer electrolyte material, it is desired the fuel crossover is small so as to maintain high concentration of the fuel in view of obtaining high power and high energy capacity in the region of high concentration of the fuel. From such a view point, it is more preferable that the methanol crossover is 2 μmol/min/cm$^2$ or less, and most preferable 1 μmol/min/cm$^2$ or less. From the view point of ensuring the proton conductivity, 0.01 μmol/min/cm$^2$ or more is preferable.

The polymer electrolyte material of the present invention, in case of using it in DMFC, preferably achieves low methanol crossover and high proton conductivity as described above at the same time. The reason for this is that to achieve one of low methanol crossover and high proton conductivity is easy even in the prior art, but compatibility between high power and high energy capacity becomes possible by achieving both low methanol crossover and high proton conductivity.

In the polymer electrolyte material and the polymer electrolyte membrane of the present invention, in view of fuel barrier properties and an increase of energy capacity using a high concentration fuel, it is more preferable that the polymer electrolyte material is excellent in resistance to solvents, that is, weight loss of the polymer electrolyte material after immersing in N-methyl pyrrolidone at 100° C. for 2 hours is 70% by weight or less. As the liquid fuel, alcohols such as methanol are often used. In the present invention, resistance to solvents is evaluated using N-methyl pyrrolidone having excellent solubility regardless of the kind of the polymer. Weight loss is more preferably 50% by weight or less, and most preferably 30% by weight or less. Weight loss of more than 70% by weight is not preferred because mechanical strength and physical durability are insufficient because of insufficient fuel barrier properties and insufficient crystallinity. In case of using for DMFC in which an aqueous high-temperature and high-concentration methanol solution is used as the fuel, the membrane solves or swells drastically. Moreover, it becomes difficult to directly apply a catalyst paste on the polymer electrolyte membrane to produce a membrane electrode assembly, and thus not only production cost increases but also interface resistance with the catalyst layer increases and sufficient power generation characteristics may not be obtained.

In the present invention, to be excellent in resistance to hot water and resistance to hot methanol means that changes in dimensions (swelling) in hot water and hot methanol, respectively, are small. When this dimensional change is large, it is not preferable because the membrane breaks or the membrane is peeled off from an electrocatalyst layer due to swelling to cause an increase in resistivity during using as a polymer electrolyte membrane. Further, when it is inferior in resistance to hot water and resistance to hot methanol, it is not preferable because in case of using a high concentration fuel such as a high concentration methanol aqueous solution, the polymer electrolyte membrane or a binder of a catalyst layer is dissolved in the fuel. These characteristics of resistance to hot water and resistance to hot methanol are both important characteristics required to an electrolyte polymer used in a polymer electrolyte fuel cell.

In the polymerization by the aromatic nucleophilic substitution reaction, which is carried out in order to obtain an aromatic polyether-type polymer to be used in the present invention, a polymer can be obtained by reacting a mixture of the above monomers in the presence of a basic compound. The polymerization can be carried out at a temperature within a range from 0 to 350° C., but the temperature is preferably 50 to 250° C. When the temperature is lower than 0° C., the reaction may not tend to proceed adequately, and when the temperature is higher than 350° C., decomposition of the polymer may tend to be initiated. The reaction can be carried out in the absence of a solvent, but is preferably carried out in a solvent. Examples of usable solvent include aprotic polar solvents such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphonetriamide, but the usable solvent is not limited to these solvent and may be any solvent which can be used as a stable solvent in the aromatic nucleophilic substitution reaction. These organic solvents can be used alone or in combination.

Examples of the basic compound include sodium hydroxide, potassium hydroxide, sodium carbonate, potassium carbonate, sodium hydrogen carbonate, and potassium hydrogen carbonate, but the basic compound can be used without being limited to these compounds as long as it can convert aromatic diols into an active phenoxide structure.

In the aromatic nucleophilic substitution reaction, water is sometimes produced as by-product. In this case, water can also be removed out of the system in the form of an azeotrope by making toluene or the like coexist irrespective of a polymerization catalyst in the reaction system. As the method of removing water out of the system, an absorbent such as molecular sieve can be used.

An azeotropic agent used for removing reaction water or water introduced during the reaction is generally any inert compound which does not substantially interfere with polymerization, is azeotropically distilled with water and boiled at a temperature of about 25 to about 250° C. Common azeotropic agent is such as benzene, toluene, xylene, chlorobenzene, methylene chloride, dichlorobenzene, and trichlorobenzene. Naturally, it is useful to select such azeotropic agent that its boiling point is lower than that of a dipolar solvent used. Generally, the azeotropic agent is used, but it is not always necessary when a high reaction temperature, for example, a temperature of 200° C. or higher, is employed, particularly when an inert gas is continuously flowed over a reaction mixture. Generally, the reaction is desirably performed in a state of oxygen-free in an inert atmosphere.

When the aromatic nucleophilic substitution reaction is carried out in a solvent, the monomer is preferably charged so as to adjust the concentration of the resulting polymer within a range from 5 to 50% by weight. When the concentration is less than 5% by weight, the polymerization degree may hardly increase. On the other hand, when the concentration is more than 50% by weight, viscosity of the reaction system increases and it may become difficult to subject the reaction product to a post-treatment.

After the completion of the polymerization reaction, the reaction solution is vaporized to remove the solvent and the residual substance is optionally washed to obtain a desired polymer. Also, the reaction solution is poured into a solvent having low solubility with a polymer and high solubility with an inorganic salt produced as by-product, thereby to remove the inorganic salt and to precipitate a polymer as a solid, and the precipitate is collected by filtration to obtain a polymer. The recovered polymer is optionally washed with water, an alcohol or other solvents, and then dried. When a desired molecular weight is obtained, a halide end group or a phenoxide end group can be optionally reacted by introducing a phenoxide or a halide end group sealing agent to produce a stable end group.

A molecular weight of the ionic group-containing polymer of the present invention thus obtained is 1000 to 5000000, and preferably 10000 to 500000 in terms of a polystyrene equivalent weight average molecular weight. When the molecular weight is less than 1000, cracks may be produced in the formed membrane and either of mechanical strength, physical durability and resistance to solvents may be insufficient. On the other hand, when the molecular weight is more than 500000, there are problems that solubility becomes inadequate, viscosity of a solution is high and processability becomes poor.

In addition, a chemical structure of the polymer electrolyte material of the present invention can be identified by S=O absorption at 1,030 to 1,045 cm$^{-1}$ and 1,160 to 1,190 cm$^{-1}$, C—O—C absorption at 1,130 to 1,250 cm$^{-1}$ and C=O absorption at 1,640 to 1,660 cm$^{-1}$ through infrared absorption spectrum, and the composition ratio thereof can be determined by acid-base titration or elemental analysis of sulfonic acid groups. Also, the structure can be confirmed by a peak of an aromatic proton at 6.8 to 8.0 ppm through a nuclear magnetic resonance spectrum ($^1$H-NMR). Also, the position and arrangement of a sulfonic acid group can be confirmed through solution $^{13}$C-NMR and solid-state $^{13}$C-NMR.

Next, a specific method of the ionic group-containing block copolymer comprising a block (B1) containing an ionic group and a block (B2) substantially not containing an ionic group is exemplified. However, the present invention is not limited these.

Examples of the ionic group-containing block copolymer to be used for the present invention include a block copolymer formed by reacting an ionic group-containing monomer and a monomer not containing an ionic group separately to form an ionic group-containing block represented by the following formula (H3-2), and/or a block not containing an ionic group represented by the following formula (H3-1), and then random copolymerizing these blocks. Further, examples of the ionic group-containing block copolymer include a block copolymer formed by reacting an ionic group-containing monomer and a polymer not containing an ionic group represented by the following formula (H3-1), a block copolymer formed by reacting a monomer not containing an ionic group and an ionic group-containing polymer represented by the following formula (H3-2), and a block copolymer by spontaneously forming a block from only a monomer taking advantage of the difference in reactivity between monomers. Furthermore, it is also possible that after obtaining a block copolymer having aromatic rings with different reactivities of a sulfonation reaction, namely, with different electron densities, an ionic group is selectively introduced into only a highly reactive site.

However, in the above method of forming an ionic group-containing block represented by the following formula (H3-2), and/or a block not containing an ionic group represented by the following formula (H3-1), and then random copolymerizing these blocks, control of a block length was difficult since the reactivity of the ionic group-containing block is significantly different from that of the block not containing an ionic group because of steric hindrance.

Accordingly, in the present invention, a method of forming an ionic group-containing block represented by the following formula (H3-4), and/or a block not containing an ionic group represented by the following formula (H3-3), and then cross-copolymerizing these blocks can be more preferably used. According to the above description, it becomes possible to synthesize a block copolymer having a required block length.

Here, in the following formulas (H3-3) and (H3-4), an ionic group-containing block of F terminal and a block not containing an ionic group of OK terminal are shown, but these may be reversed.

[Chemical Formula 17]

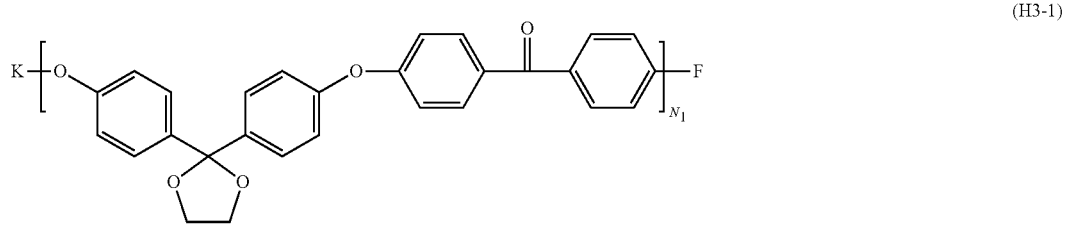

(H3-1)

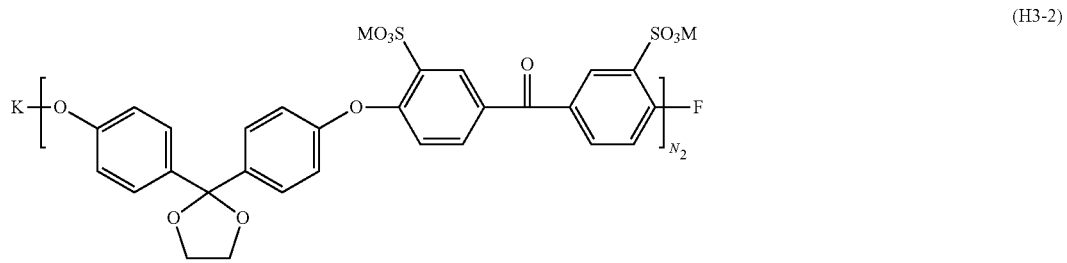

(H3-2)

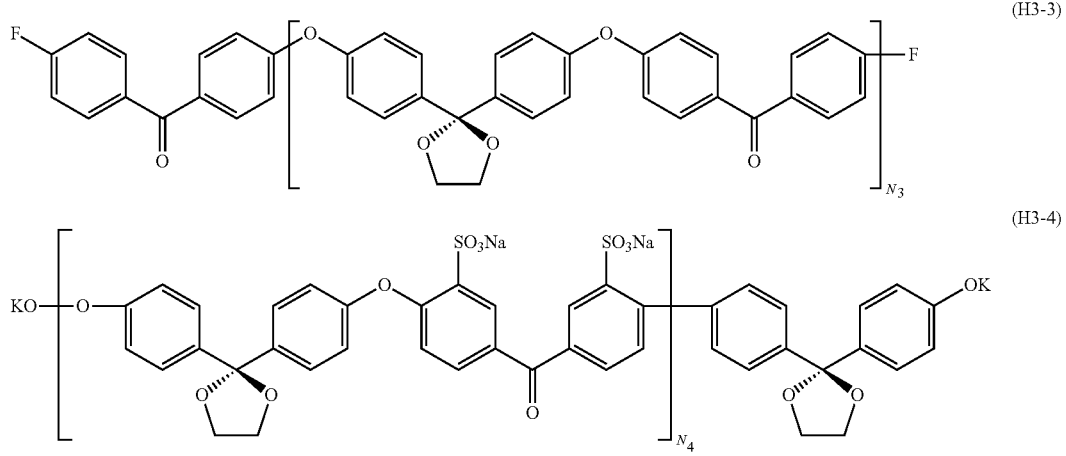

In the above formulas (H3-1) to (H3-4), a halogen atom is represented by F, and an alkaline metal is represented by Na and K, but they are not limited to these and others can be used. The above formulas are inserted for the purpose of helping the understanding of readers, and do not always express precisely a chemical structure, exact composition, arrangement, a position of a sulfonic acid, quantity and a molecular weight of polymerizing components, of a polymer, and the present invention is not limited to these chemical structural formulas.

Furthermore, in the aforementioned formulas (H3-1) to (H3-4), a ketal group is introduced into any block as a protective group. However, in the present invention, the protective group may be introduced into a component having high crystallinity and low solubility and the aforementioned formulas (H3-2) and (H3-4) do not necessarily require the protective group, and it is preferable that there is no the protective group from the viewpoint of durability and dimensional stability.

Further, with respect to a block shown in the formula (H3-3), an oligomer with a controlled molecular weight can be synthesized by reacting a bisphenol component and an aromatic dihalide component in proportions of $N_3:(N_3+1)$. The same holds true with regard to the formula (H3-4).

The method of forming the polymer electrolyte material of the present invention into a polymer electrolyte membrane is not particularly limited, and a method of forming a membrane from a solution state or a method of forming a membrane from a molten state can be used in a stage of having a protective group such as ketal. In the former, for example, the polymer electrolyte material is dissolved in a solvent such as N-methyl-2-pyrrolidone and the solution is applied and spread over a glass plate, and then the solvent is removed to form a membrane.

As the solvent be used to form a membrane, any can be used as long as a polymer electrolyte material can be dissolved in it and it can be removed, and an aprotic polar solvent such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphonetriamide; an ester-type solvent such as γ-butyrolactone or butyl acetate; a carbonate-type solvent such as ethylene carbonate or propylene carbonate; an alkylene glycol monoalkyl ether such as ethylene glycol monomethyl ether, ethylene glycol monoethyl ether, propylene glycol monomethyl ether, and propylene glycol monoethyl ether; an alcohol-type solvent such as isopropanol; water and a mixture thereof are preferably used, and an aprotic polar solvent is preferable because of its high solubility.

Further, in the present invention, when the block copolymer is used, selection of the solvent is important for a phase separation structure, and a method of mixing an aprotic polar solvent and a less polar solvent to use is preferable.

It is preferred to subject a polymer solution prepared so as to have a required solid content to filtration under pressured or not to remove impurities (or unknown substances) contained in the polymer electrolyte solution, in order to obtain a tough membrane. A filter medium used herein is not specifically limited and is preferably a glass filter or a metal filter. A minimum pore size of the filter, through which the polymer solution passes in the filtration, is preferably 1 μm or less. If the polymer is not subjected to filtration, it is not preferable since it allows impurities matters to mix in to cause break of a membrane or deterioration of durability.

Then, in the resulting polymer electrolyte membrane, it is preferred to heat treatment at least a part of the ionic group in a state of metal salt. If the polymer electrolyte material to be used is a polymer which is polymerized in a state of metal salt in polymerization, it is preferably formed into a membrane and heat treated as it is. Metals in metal salts may be those capable of forming salts with sulfonic acid, but it is preferably Li, Na, K, Rb, Cs, Mg, Ca, Sr, Ba, Ti, V, Mn, Fe, Co, Ni, Cu, Zn, Zr, Mo, and W, and among these metals, Li, Na, K, Ca, Sr, and Ba are more preferable, and Li, Na, K are furthermore preferable.

The temperature of the heat treatment is preferably from 150 to 550° C., more preferably from 160 to 400° C., and particularly preferably from 180 to 350° C. The time for heat treatment is preferably from 10 seconds to 12 hours, more preferably from 30 seconds to 6 hours, and particularly preferably from one minute to one hour. When the temperature of the heat treatment is too low, an effect of inhibiting fuel crossover, elastic modulus and strength at break are insufficient. On the other hand, when the temperature of the heat treatment is too high, a membrane material tends to deteriorate. When a time of a heat treatment is less than 10 seconds, an effect of heat treatment is deficient. On the other hand, when the time of a heat treatment is more than 12 hours, a membrane material tends to deteriorate. The polymer electrolyte membrane obtained by the heat treatment is capable of proton substitution by immersing it in an acid aqueous solution as required. Forming by this method enables the polymer electrolyte membrane of the present invention it to achieve proton conductivity and fuel barrier properties simultaneously in a good balance.

As a method for converting the polymer electrolyte material used in the present invention to a membrane, there is a method in which a membrane composed of the polymer electrolyte material is prepared by the above technique, and then at least a part of a ketone group protected with ketal is deprotected to form a ketone group. In accordance with this method, it becomes possible to form a membrane from a solution of a block copolymer with low solubility comprising a block not containing an ionic group, and it becomes possible to achieve proton conductivity and fuel barrier properties simultaneously, and excellent resistance to solvents, mechanical strength and physical durability.

In the polymer electrolyte membrane of the present invention, the polymer structure can be furthermore optionally crosslinked by means such as irradiation. By crosslinking such polymer electrolyte membrane, it is possible to expect an effect of further inhibiting fuel crossover and swelling due to fuel, and mechanical strength may be improved and the electrolyte membrane may become better. Irradiation includes, for example, irradiation with electron beam and irradiation with γ-ray.

With respect to a membrane thickness of the polymer electrolyte membrane of the present invention, a membrane having a thickness of 1 to 2,000 μm is preferably used. For the purpose of obtaining the mechanical strength and the physical durability of a membrane enduring practical use, the thickness is more preferably more than 1 μm, and for the purpose of decreasing membrane resistance, namely, improving of power generation performance, the thickness is preferably less than 2000 μm. The thickness is more preferably from 3 to 500 μm, and particularly preferably from 5 to 250 μm. The thickness can be controlled by the concentration of the solution or the thickness of the coat on a substrate.

Moreover, additives used in a conventional polymer compound, for example, crystallization nucleating agents, plasticizers, stabilizers, antioxidants and releasants can be added to the polymer electrolyte membrane as long as the object of the present invention is not adversely affected.

Further, as long as various properties described above are not adversely affected, the polymer electrolyte membrane obtained according to the present invention can contain various polymers, elastomers, fillers, fine particles and various additives for the purpose of improving mechanical strength, thermal stability and processability. Moreover, the membrane may be reinforced with a fine porous membrane, a nonwoven fabric or a mesh.

Further, a membrane electrode assembly obtained according to the present invention means a membrane electrode assembly containing the polymer electrolyte membrane of the present invention or the polymer electrolyte material of the present invention in a polymer electrolyte membrane or in a catalyst layer. The membrane electrode assemblies are parts in which the polymer electrolyte membrane and an electrode are assembled.

The method for assembling a polymer electrolyte membrane with an electrode when the polymer electrode membrane is used for fuel cell is not specifically limited, and well-known methods (for example, chemical plating method described in Electrochemistry, 1985, 53, p. 269, and thermal press-bonding method by a gas diffusion electrode, described in Electrochemical Science and Technology, edited by J. Electrochem. Soc., 1988, 135, 9, p. 2209) are applicable thereto.

In case of assembling using a hot press, the temperature and the pressure are appropriately selected according to the thickness of the electrolyte membrane, the moisture content, the catalyst layer or the electrode substrate. Moreover, in the present invention, assembling can be carried out by press even if the electrolyte membrane is dried or the membrane is water-absorbed. Specific examples of the press method includes roll press in which the pressure and the clearance are defined, and flat plate press in which the pressure is defined, and the press is preferably carried out at a temperature within a range of 0 to 250° C. from the viewpoint of industrial productivity and inhibition of thermal decomposition of the polymer electrolyte material having an ionic group. It is preferable that the pressure is as low as possible from the viewpoint of protection of the polymer electrolyte membrane and the electrode, and in the case of the flat plate press, the pressure is preferably 10 MPa or less, and it is one of preferable choices from the viewpoint of prevention of short-circuit of anode and cathode to laminate an electrode and a polymer electrolyte membrane to manufacture a fuel cell without assembling by a hot press process. In case of this method, when power generation is repeated as the fuel cell, deterioration of the polymer electrolyte membrane, which is considered to be caused by the short-circuited portion, may be inhibited and durability as a fuel cell is improved.

The fuel of the fuel cell using the membrane electrode assembly of the present invention includes oxygen, hydrogen, an organic compound having 1 to 6 carbon atoms such as methane, ethane, propane, butane, methanol, isopropyl alcohol, acetone, glycerin, ethylene glycol, formic acid, acetic acid, dimethyl ether, hydroquinone, or cyclohexane, and a mixture of water of the compound, and these fuels may be used alone or in combination. Particularly, from the viewpoint of power generation efficiency and the system simplification of the entire cell, hydrogen and a fuel containing an organic compound having 1 to 6 carbon atoms are preferably used, and in view of power generation efficiency, hydrogen and an aqueous methanol solution are particularly preferably used. In case of using an aqueous methanol solution, the concentration of methanol is appropriately selected according to the system of the fuel cell to be used. However, the concentration is preferably as high as possible from the viewpoint of long-term operation. For example, in the active-type fuel cell having auxiliary machines such as a system of supplying a medium required for power generation to the membrane electrode assembly, for example, a liquid supply pump and a blower fan, a cooling fan, a fuel diluting system and a product recovery system, it is preferable that the fuel having the methanol concentration of 30 to 100% or more is injected from a fuel tank or a fuel cassette, diluted to about 0.5 to 20% and then supplied to the membrane electrode assembly. A fuel having a methanol concentration of 10 to 100% is preferable for a passive-type fuel cell having no auxiliary machine.

Furthermore, applications of a polymer electrolyte fuel cell using the polymer electrolyte membrane of the present invention, but not particularly limited, are preferably electric power supply for mobile objects. Particularly, it is preferably used as electric power supply for portable devices such as cellular phone, personal computer, PDA, television set, radio, music player, game machine, headset and DVD player, various robots such as industrial humanoid robot and animal type robot, household appliances such as cordless cleaners, toys, and mobile bodies, for example, vehicles such as electric bicycle, motorcycle, automobile, bus and trucks, marine vessels and railroads; substitutions of conventional primary and secondary cells, such as stationary type power generator; or hybrid power sources in which this polymer electrolyte fuel cell is used in combination with conventional primary and secondary cells.

EXAMPLES

The present invention will now be described by way of examples, but the present invention is not limited to the following examples. Measuring conditions of the respective physical properties are as follows. Further, chemical structural formulas are inserted in the present Examples, but these chemical structural formulas are inserted for the purpose of helping the understanding of readers, and do not always express precisely a chemical structure, exact composition, arrangement, a position of a sulfonic acid and a molecular weight of polymerizing components of a polymer, and the present invention is not limited to these chemical structural formulas.

(1) Density of Sulfonic Acid Group

A sample of a membrane as a specimen was immersed in pure water at 25° C. for 24 hours and, after vacuum drying at 40° C. for 24 hours, elemental analysis was carried out. Analysis of carbon, hydrogen and nitrogen was carried out by a full automatic elemental analysis apparatus varioEL, analysis of sulfur was carried out by flask combustion method and titration with barium acetate, and analysis of fluorine was carried out by flask combustion and ion chromatogram methods. Density (mmol/g) of sulfonic acid group per unit gram was calculated from a composition ratio of a polymer.

(2) Proton Conductivity

After a sample of a membrane was immersed in pure water at 25° C. for 24 hours, it was held in a thermo-hygrostat of 80° C. and a relative humidity of 95% for 30 minutes, and then proton conductivity was measured by a potentiostatic AC impedance method.

As a measuring apparatus, an electrochemical measuring system manufactured by Solartron (Solartron 1287 Electrochemical Interface and Solartron 1255B Frequency Response Analyzer) was used, and a potentiostatic impedance was measured by a two-terminal method to determine proton conductivity. An AC amplitude was set at 50 mV. As a sample, a membrane of 10 mm in width and 50 mm in length was used. A measuring jig was made of a phenolic resin and a measuring section was opened. Platinum plates (two plates of 100 μm in thickness) were used as an electrode. The electrodes were located at a distance of 15 mm on topside and reverse side of a sample membrane so as to be parallel to each other and orthogonal to a longitudinal direction of the sample membrane.

(3) Number Average Molecular Weight, Weight Average Molecular Weight

A number average molecular weight and a weight average molecular weight of a polymer were measured by GPC. Using HLC-8022GPC manufactured by TOSOH Corporation as an integrated-type apparatus of an ultraviolet detector and a differential refractometer and two TSK gel SuperHM-H (inner diameter: 6.0 mm, length: 15 cm) manufactured by TOSOH Corporation as a GPC column, a polystyrene equivalent number average molecular weight and weight average molecular weight were measured at a sample concentration of 0.1% by weight, a flow rate of 0.2 mL/min, and a temperature of 40° C., using a N-methyl-2-pyrrolidone solvent (a N-methyl-2-pyrrolidone solvent containing 10 mmol/L of lithium bromide).

(4) Membrane Thickness

Using Model ID-C112 manufactured by Mitutoyo Corporation set to Granite Comparator Stand BSG-20 manufactured by Mitutoyo Corporation.

(5) Measurement of Crystallization Calorie by Differential Scanning Calorimetry (DSC)

A polymer electrolyte material (3.5 to 4.5 mg) as a specimen was preliminarily dried at a temperature at which sulfonic acid group is not decomposed (for example, 40 to 100° C.) to remove moisture, and then the weight is measured. In this case, since there is a possibility that a chemical structure and a conformational structure of the polymer vary, the temperature should not raised to the temperature higher than the crystallization temperature or thermal decomposition temperature. After measuring the weight, the polymer electrolyte material was subjected to temperature modulation differential scanning calorimetry in a first temperature rising stage under the following conditions.

DSC apparatus: DSC Q100 manufactured by TA Instruments Co.

Measuring temperature range: 25° C. to thermal decomposition temperature (for example, 310° C.)

Temperature raising rate: 5° C./min

Amplitude: ±0.796° C.

Amount of sample: about 4 mg

Sample pan: crimp pan made of aluminum

Measuring atmosphere: nitrogen, 50 ml/min

Preliminary drying: vacuum drying at 60° C. for one hour

A value obtained by duplicating heat from the low temperature side to a peak top was calculated as a crystallization heat. Since the specimen contained moisture, the moisture content was calculated from detected evaporation heat of moisture and then the weight of the polymer electrolyte material was corrected. Enthalpy (or Heat) of evaporation of water is 2277 J/g.

Weight (g) of moisture in sample=Enthalpy of evaporation (J/g) of moisture of sample×amount (g) of sample/2277 (J/g)

Enthalpy of crystallization Correction Value (J/g) =Enthalpy of crystallization (J/g)×Amount (g) of Sample/(Amount of Sample−Weight (g) of Moisture in Sample)

(6) Measurement of the Degree of Crystallinity by Wide Angle X-Ray Diffraction (XRD)

A polymer electrolyte material as a specimen was set to a diffractometer and X-ray diffraction was carried out under the following conditions.

X-ray diffractometer: RINT2500V manufactured by Rigaku Corporation

X-ray: Cu-Kα

X-ray output: 50 kV-300 mA

Optical system: concentration optical system

Scan speed: 2θ=2°/min

Scan method: 2θ-θ

Scan range: 2θ=5 to 60°

Slit: divergence slit-½°, light receiving slit-0.15 mm, scattering slit-½°

The degree of crystallinity was determined as follows: That is, each component was separated by profile fitting and a diffraction angle and an integrated intensity of each component were determined, and then the degree of crystallinity was calculated from a calculation equation of the general formula (S2) using an integrated intensity of the resulting crystalline peak and amorphous halo.

The degree of crystallinity (%)=(Sum of integrated intensity of entire crystalline peak)/(Sum of integrated intensity of entire crystalline peak and amorphous halo)×100     (S2)

(7) Visual Identification of Presence or Absence of Phase Separation Structure

A sample of a membrane was immersed in pure water at 25° C. for 24 and taken out in an atmosphere at 25° C. and a relative humidity of 50 to 80%, and the presence or absence of a phase separation structure was visually identified.

(8) Observation of Phase Separation Structure by Transmission Electron Microscope (TEM)

A sample of a membrane was Cut into a piece of 5 mm×15 mm, and this sample piece was immersed in a 10 wt % solution of cesium acetate (solvent: ethanol) as a dyeing agent and was allowed to stand at 25° C. for 24 hours. The sample subjected a dyeing treatment was taken out and cut into a piece of 1 mm×5 mm, and the piece was embedded in a visible light curable resin and irradiated for 30 seconds with visible light to be fixed.

A sample was sliced off at room temperature using a ultramicrotome, and the resulting section was recovered on a Cu grid and subjected to TEM observation. TEM observation was carried out at an accelerate voltage of 100 kV and microphotographs were taken at 5000-fold, 20000-fold and 50000-fold magnifications. As measuring apparatus, Ultramicrotome ULTRACUT UCT (manufactured by Leica Microsystems AG) and TEM H-7650 (manufactured by Hitachi, Ltd.) were used.

Further, with respect to image processing, processing of shading correction, density conversion, and spatial filter was performed on TEM original images in an automatic mode using LUZEX AP manufactured by NIRECO Corporation. Furthermore, processed images were expressed in 256 tones of from black to white in an automatic mode of this apparatus. In the case where tones of 0 to 128 was defined as black color and tones of 129 to 256 was defined as white color, measurement was performed with parameters of a circle equivalent diameter, a distance between particles, a maximum length, a width of each layer and an interlayer distance to determine an average interlaminar distance and an average distance between particles.

(9) Measuring Method of Purity

Quantitative analysis was carried out in the following conditions with a gas chromatography (GC).
Column: DB-5 (manufactured by J&W) L=30 m φ=0.53 mm D=1.50 μm
Carrier: helium (line speed=35.0 cm/sec)

| Analyzing condition | |
|---|---|
| INJ. temp. | 300° C. |
| Detct. temp. | 320° C. |
| Oven | 50° C. for 1 min |
| Rate | 10° C./min |
| Final | 300° C. for 15 min |
| SP ratio | 50:1 |

(10) Resistance to Hot Water and Resistance to Hot Methanol

Resistance to hot water and resistance to hot methanol of an electrolyte membrane were evaluated by measuring a dimensional change ratio in an aqueous 30 wt % methanol solution at 60° C. The electrolyte membrane was cut into strips having a length of about 5 cm and a length of about 1 cm and, after immersing in water at 25° C. for 24 hours, the length (L1) of each strip was measured by a caliper. The electrolyte membrane was immersed in an aqueous 30 wt % methanol solution at 60° C. for 12 hours and the length (L2) was measured again by a caliper, and then the dimensional change was visually observed.

Synthesis Example 1

Synthesis of 2,2-bis(4-hydroxyphenyl)-1,3-dioxolane Represented by the Following General Formula (G1)

[Chemical Formula 18]

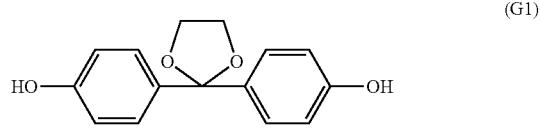

(G1)

Into a 500 ml flask equipped with a stirrer, a thermometer and a distillate tube, 49.5 g of 4,4'-dihydroxybenzophenone, 134 g of ethylene glycol, 96.9 g of trimethyl orthoformate and 0.50 g of p-toluenesulfonic acid monohydrate were charged to be dissolved. Thereafter, the resulting solution was kept at a temperature of 78 to 82° C. and stirred for 2 hours. Furthermore, an internal temperature was gradually raised to 120° C. and heating was continued until distillation of methyl formate, methanol and trimethyl orthoformate completely ceases. This reaction solution was cooled to room temperature and then diluted with ethyl acetate, and an organic layer was washed with 100 ml of a 5% aqueous solution of potassium carbonate and separated, and a solvent was distilled off. To a residue, 80 ml of dichloromethane was added to precipitate a crystal and the resulting mixture was filtered and dried to obtain 52.0 g of 2,2-bis(4-hydroxyphenyl)-1,3-dioxolane. This crystal was analyzed by gas chromatography to yield 99.8% of 2,2-bis(4-hydroxyphenyl)-1,3-dioxolane and 0.2% of 4,4'-dihydroxybenzophenone.

Synthesis Example 2

Synthesis of Disodium 3,3'-disulfonate-4,4'-difluorobenzophenone Represented by the Following General Formula (G2)

[Chemical Formula 19]

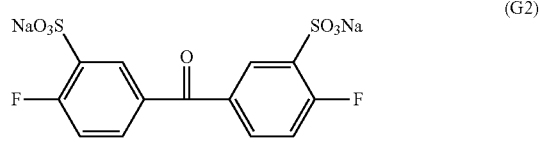

(G2)

109.1 g of 4,4'-difluorobenzophenone (Aldrich reagent) was reacted at 100° C. for 10 hours in 150 ml of a fuming sulfuric acid (50% SO₃) (manufactured by Wako Pure Chemical Industries, Ltd.). Thereafter, the reactant was charged into a large amount of water little by little, and the resulting mixture was neutralized with NaOH, and to this, 200 g of common salt was added to precipitate a synthetic product. The resulting precipitate was filtered and then recrystallized from an aqueous ethanol solution to obtain disodium 3,3'-disulfonate-4,4'-difluorobenzophenone represented by the above general formula (G2). Purity was 99.3%. The structure was confirmed by $^1$H-NMR. Impurities were quantitatively analyzed by capillary electrophoresis (organic matter) and ion chromatography (inorganic matter).

Example 1

(Polymerization of Prepolymer a1 Represented by the Following General Formula (G3))

[Chemical Formula 20]

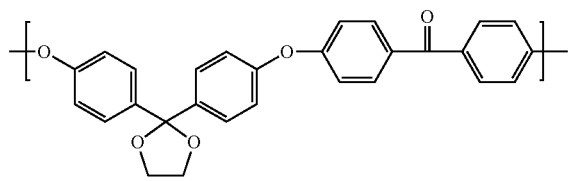

(G3)

Into a 500 mL three-necked flask equipped with a stirrer, a nitrogen introducing tube and a Dean-Stark trap, 13.82 g (Aldrich reagent, 100 mmol) of potassium carbonate, 20.66 g (80 mmol) of K-DHBP obtained in the above Synthesis Example 1, and 17.46 g (Aldrich reagent, 80 mmol) of 4,4'-difluorobenzophenone were charged, and after the atmosphere in the flask was replaced by nitrogen, the resulting mixture was dehydrated at 180° C. in 90 mL of N-methyl pyrrolidone (NMP) and 45 mL of toluene, and the dehydrated content was heated to remove toluene and polymerization was carried out at 230° C. for 1 hour. The reaction solution was purified by reprecipitating with a large amount of water to obtain a prepolymer a1 represented by the general formula (G3). The prepolymer a1 had a weight average molecular weight of 50,000.

(Polymerization of Block Copolymer b1)

Into a 500 mL three-necked flask equipped with a stirrer, a nitrogen introducing tube and a Dean-Stark trap, 6.91 g (Aldrich reagent, 50 mmol) of potassium carbonate, 8.73 g (20 mmol) of the prepolymer a1, 10.33 g (40 mmol) of K-DHBP obtained in the above Synthesis Example 1, 3.49 g (Aldrich reagent, 16 mmol) of 4,4'-difluorobenzophenone, and 10.13 g (24 mmol) of disodium 3,3'-disulfonate-4,4'-difluorobenzophenone obtained in the above Synthesis Example 2 were charged, and after the atmosphere in the flask was replaced by nitrogen, the resulting mixture was dehydrated at 180° C. in 120 mL of N-methyl pyrrolidone (NMP) and 45 mL of toluene, and the dehydrated content was heated to remove toluene and polymerization was carried out at 230° C. for 10 hours. The reaction solution was purified by reprecipitating with a large amount of water to obtain a block polymer b1. The block polymer b1 had a weight average molecular weight of 250,000.

The block polymer b1 is composed of a block (B2) of the prepolymer a1 in which the above general formula (G3) is a repeating unit and a block (B1) of a repeating unit which is composed of the above general formula G1), benzophenone, and disulfonate in proportions of 10:4:6. A ratio W1/W2 of the block polymer b1 was 40 mmol/20 mmol, namely, 2.

A 25 wt % N-methyl pyrrolidone (NMP) solution, in which the resulting block polymer b1 was dissolved, was pressure-filtered using a glass fiber filter and then applied and spread over a glass substrate. After drying at 100° C. for 4 hours and heating to 300° C. over 30 minutes under nitrogen, a heat treatment was carried out at 300° C. for 10 minutes to obtain a polyketal ketone membrane (membrane thickness 30 μm). The solubility of a polymer was extremely good. The resulting membrane was immersed in 6N hydrochloric acid at 95° C. for 24 hours, subjected to proton substitution and deprotection reaction, and then sufficiently washed by immersing in a large excess amount of pure water for 24 hours to obtain polymer electrolyte membrane. The density of a sulfonic acid group was 1.7 mmol/g.

In the resulting polymer electrolyte membrane, a crystallization temperature was recognized in DSC (the first heating stage) and a crystallization heat was 28.0 J/g. Also, a crystalline peak was not recognized in wide angle X-ray diffraction (the degree of crystallinity 0%). Since the polymer electrolyte membrane was an extremely tough electrolyte membrane and formed a phase separation structure because it appeared to become opaque. Its proton conductivity was 110 mS/cm. Further, even when the membrane was immersed in hot water or hot methanol, the membrane was neither dissolved nor collapsed and the rate L2/L1 of dimensional change was as small as 10%, and therefore the membrane was extremely excellent in resistance to hot water and resistance to hot methanol.

Moreover, a phase separation structure in which an average interlaminar distance was 200 nm could be identified by TEM observations. With respect to a sea component, the component in a membrane thickness direction is four times larger than that of a membrane surface direction and anisotropy was recognized.

Example 2

(Polymerization of Prepolymer a2 Represented by the Above General Formula (G3))

In the same manner as in Example 1, except that a polymerization time was changed from 1 hour to 1.5 hours, a prepolymer a2 was obtained by polymerization. The prepolymer a2 had a weight average molecular weight of 60,000.

(Polymerization of Block Copolymer b2)

In the same manner as in Example 1, except for charging 17.46 g (40 mmol) of the prepolymer a2 in place of the prepolymer a1, a polyketal ketone polymer and a polymer electrolyte membrane were prepared. The polyketal ketone polymer had a weight average molecular weight of 280,000. The solubility of the polymer was extremely good. A ratio W1/W2 of the block polymer b2 was 1. The density of a sulfonic acid group of the resulting membrane was 1.4 mmol/g.

In the resulting polymer electrolyte membrane, a crystallization temperature was recognized in DSC (the first heating stage) and a crystallization heat was 33.2 J/g. Also, a crystalline peak was not recognized in wide angle X-ray diffraction (the degree of crystallinity 0%). Since the polymer electrolyte membrane was an extremely tough electrolyte membrane and formed a phase separation structure because it appeared to become opaque. Its proton conductivity was 72 mS/cm. Even when the membrane was immersed in hot water or hot methanol, the membrane was neither dissolved nor collapsed and the rate L2/L1 of dimensional change was as small as 7%, and therefore the membrane was extremely excellent in resistance to hot water and resistance to hot methanol. Moreover, a phase separation structure in which an average interlaminar distance was 400 nm could be identified by TEM observations.

Example 3

The polymer electrolyte membrane obtained in Example 2 was heated to 270° C. in DSC and quenched and a sample of the polymer electrolyte membrane was taken out. In addition, 270° C. is a temperature at which crystallization proceeds but thermal decomposition does not occur. This sample exhibited a crystallization heat of 0 when DSC was measured again. On the other hand, in wide angle X-ray diffraction (XRD), the degree of crystallinity of 14% was observed. Also, by TEM observations, a phase separation structure in which an average interlaminar distance is 40 nm can be identified.

Example 4

(Polymerization of Prepolymer a4 Represented by the Above General Formula (G3))

In the same manner as in Example 1, except that a polymerization time was changed from 1 hour to 0.5 hour, a prepolymer a4 was obtained by polymerization. The prepolymer a4 had a weight average molecular weight of 30,000.

(Polymerization of Block Copolymer b4)

In the same manner as in Example 1, except for charging 17.46 g (40 mmol) of the prepolymer a4 in place of the prepolymer a1, 3.46 g (25 mmol) of potassium carbonate in place of 6.91 g (Aldrich reagent, 50 mmol) of that, 5.17 g (20 mmol) of K-DHBP obtained in the above Synthesis Example 1, 1.75 g (Aldrich reagent, 8 mmol) of 4,4'-difluorobenzophenone, and 5.06 g (12 mmol) of disodium 3,3'-disulfonate-4,4'-difluorobenzophenone obtained in the above Synthesis Example 2, a polyketal ketone polymer and a polymer electrolyte membrane were prepared. The polyketal ketone polymer had a weight average molecular weight of 320,000. The solubility of the polymer was extremely good. A ratio W1/W2 of the block polymer b4 was 0.5. The density of a sulfonic acid group of the resulting membrane was 1.0 mmol/g.

In the resulting polymer electrolyte membrane, a crystallization temperature was recognized in DSC (the first heating stage) and a crystallization heat was 35.2 J/g. Also, a crystalline peak was not recognized in wide angle X-ray diffraction (the degree of crystallinity 0%). Since the polymer electrolyte membrane was an extremely tough electrolyte membrane and formed a phase separation structure because it appeared to become opaque. Its proton conductivity was 41 mS/cm. Even when the membrane was immersed in hot water or hot methanol, the membrane was neither dissolved nor collapsed and the rate L2/L1 of dimensional change was as small as 2%, and therefore the membrane was extremely excellent in resistance to hot water and resistance to hot methanol. Moreover, a phase separation structure in which an average interlaminar distance was 120 nm could be identified by TEM observations.

Example 5

(Polymerization of Prepolymer a54 Represented by the Above General Formula (G3))

In the same manner as in Example 1, except that a polymerization time was changed from 1 hour to 1 hour and 10 minutes, a prepolymer a5 was obtained by polymerization. The prepolymer a5 had a weight average molecular weight of 40,000.

(Polymerization of Block Copolymer b5)

In the same manner as in Example 1, except for charging 4.36 g (10 mmol) of the prepolymer a5 in place of the prepolymer a1, 4.36 g (20 mmol) of 4,4'-difluorobenzophenone in place of 3.49 g (Aldrich reagent, 16 mmol) of that, and 8.45 g (20 mmol) of disodium 3,3'-disulfonate-4,4'-difluorobenzophenone obtained in the above Synthesis Example 2 in place of 10.13 g (24 mmol) of that, a polyketal ketone polymer and a polymer electrolyte membrane were prepared. The resulting polyketal ketone polymer had a weight average molecular weight of 210,000. The solubility of the polymer was extremely good. A ratio W1/W2 of the block polymer b5 was 4. The density of a sulfonic acid group of the resulting membrane was 1.7 mmol/g.

In the resulting polymer electrolyte membrane, a crystallization temperature was recognized in DSC (the first heating stage) and a crystallization heat was 27.5 J/g. Also, a crystalline peak was not recognized in wide angle X-ray diffraction (the degree of crystallinity 0%). Since the polymer electrolyte membrane was an extremely tough electrolyte membrane and formed a phase separation structure because it appeared to become opaque. Its proton conductivity was 114 mS/cm. Even when the membrane was immersed in hot water or hot methanol, the membrane was neither dissolved nor collapsed and the rate L2/L1 of dimensional change was as small as 9%, and therefore the membrane was extremely excellent in resistance to hot water and resistance to hot methanol. Moreover, a phase separation structure in which an average interlaminar distance was 140 nm could be identified by TEM observations.

Comparative Example 1

A commercially available NAFION® 111 membrane (manufactured by DuPont Co.) was used to evaluate various properties. NAFION® 111 membrane was immersed in a 5% hydrogen peroxide water at 100° C. for 30 minutes, immersed in 5% dilute sulfuric acid at 100° C. for 30 minutes and then adequately washed with deionized water at 100° C. In the resulting polymer electrolyte membrane, a crystallization temperature was not recognized in DSC (first heating stage). Also, as a result of wide angle X-ray diffraction, no crystalline peak was recognized: Since the polymer electrolyte membrane was visually transparent, a phase separation structure was not formed. Its proton conductivity was 80 mS/cm. Further, when the membrane was immersed in hot water or hot methanol, it swelled intensely and became difficult to handle, and therefore it sometimes broke in picking up. The rate L2/L1 of dimensional change was as large as 26%, and therefore the membrane was inferior in resistance to hot water and resistance to hot methanol. Moreover, a phase separation structure (cluster structure) in which an average interlaminar distance was 6 nm could be identified by TEM observations.

Comparative Example 2

(Polymerization of Prepolymer C1 Represented by the Following General Formula (G4))

[Chemical Formula 21]

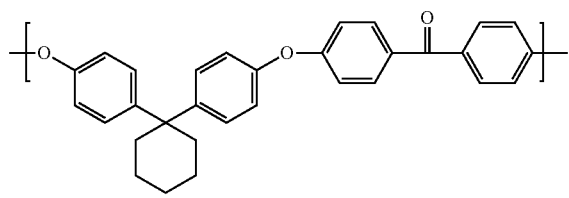

Into a 500 mL three-necked flask equipped with a stirrer, a nitrogen introducing tube and a Dean-Stark trap, 13.82 g (Aldrich reagent, 100 mmol) of potassium carbonate, 21.47 g (80 mmol) of 1,1-bis(4-hydroxyphenyl)cyclohexane, and 17.46 g (Aldrich reagent, 80 mmol) of 4,4'-difluorobenzophenone were put, and after the atmosphere in the flask was replaced by nitrogen, the resulting mixture was dehydrated at 180° C. in 90 mL of N-methyl pyrrolidone (NMP) and 45 mL of toluene, and the dehydrated content was heated to remove toluene and polymerization was carried out at 230° C. for 1 hour. The reaction solution was purified by reprecipitating with a large amount of water to obtain a prepolymer c1 represented by the general formula (G4). The prepolymer c1 had a weight average molecular weight 50,000.
(Polymerization of Block Copolymer d1)

Into a 500 mL three-necked flask equipped with a stirrer, a nitrogen introducing tube and a Dean-Stark trap, 6.91 g (Aldrich reagent, 50 mmol) of potassium carbonate, 8.94 g (20 mmol) of the prepolymer c1, 10.73 g (40 mmol) of 1,1-bis(4-hydroxyphenyl)cyclohexane, 2.18 g (Aldrich reagent, 10 mmol) of 4,4'-difluorobenzophenone, and 12.67 g (30 mmol) of disodium 3,3'-disulfonate-4,4'-difluorobenzophenone obtained in the above Synthesis Example 2 were charged, and after the atmosphere in the flask was replaced by nitrogen, the resulting mixture was dehydrated at 180° C. in 120 mL of N-methyl pyrrolidone (NMP) and 45 mL of toluene, and the dehydrated content was heated to remove toluene and polymerization was carried out at 230° C. for 10 hours. The reaction solution was purified by reprecipitating with a large amount of water to obtain a block polymer d1. The block polymer d1 had a weight average molecular weight of 250,000. A ratio W1/W2 of the block polymer d1 was 2.

A 25 wt % N-methyl pyrrolidone (NMP) solution, in which the resulting block polymer d1 was dissolved, was pressure-filtered using a glass fiber filter and then applied and spread over a glass substrate. After drying at 100° C. for 4 hours and heating to 300° C. over 30 minutes under nitrogen, a heat treatment was carried out at 300° C. for 10 minutes to obtain a membrane (membrane thickness 30 μm). The solubility of a polymer was extremely good. The membrane was immersed in a large excess amount of pure water for 24 hours and then sufficiently washed to obtain a polymer electrolyte membrane. The density of a sulfonic acid group of the resulting membrane was 1.9 mmol/g.

In the resulting polymer electrolyte membrane, a crystallization temperature was not recognized in DSC (first heating stage). Also, a crystalline peak was not recognized in wide angle X-ray diffraction (the degree of crystallinity 0%). Since the resulting polymer electrolyte membrane had only such low strength that the membrane is broken when picked up with tweezers and formed a phase separation structure because it appeared to become opaque. Its proton conductivity was 118 mS/cm. Further, when the membrane was immersed in hot water or hot methanol, it swelled intensely and the rate L2/L1 of dimensional change was 56%, and therefore the membrane was inferior in resistance to hot water and resistance to hot methanol. Moreover, a phase separation structure in which an average interlaminar distance was 200 nm could be identified by TEM observations.

Comparative Example 3

In the same manner as in Example 1, except that the charge amount of 20.66 g (80 mmol) of K-DHBP obtained in the above Synthesis Example 1 was changed to 17.1 g (80 mmol) of DHBP, a polyetherketone polymer was obtained by polymerization. From the initial stage of the polymerization, a polymer was precipitated and the polymerization was hardly carried out. Since the polymer was insoluble in a solvent, polymerization of a block polymer was difficult.

Comparative Example 4

Into a 500 mL three-necked flask equipped with a stirrer, a nitrogen introducing tube and a Dean-Stark trap, 13.82 g (Aldrich reagent, 100 mmol) of potassium carbonate, 20.66 g (80 mmol) of K-DHBP obtained in the above Synthesis Example 1, 12.2 g (Aldrich reagent, 56 mmol) of 4,4'-difluorobenzophenone, and 10.1 g (24 mmol) of disodium 3,3'-disulfonate-4,4'-difluorobenzophenone obtained in the above Synthesis Example 2 were charged, and after the atmosphere in the flask was replaced by nitrogen, the resulting mixture was dehydrated at 180° C. in 100 mL of N-methyl pyrrolidone (NMP) and 50 mL of toluene, and the dehydrated content was heated to remove toluene and polymerization was carried out at 230° C. for 6 hours. The reaction solution was purified by reprecipitating with a large amount of water to obtain a polyketal ketone random copolymer. The polyketal ketone random copolymer had a weight average molecular weight of 250,000.

Next, a polymer electrolyte membrane was prepared by the method described in Example 1. A ratio W1/W2 of the membrane becomes 1/0. The density of a sulfonic acid group of the resulting membrane was 0.9 mmol/g. Since the resulting membrane was transparent, a phase separation structure was not recognized visually. The membrane was excellent in dimensional stability, but it was inferior in proton conductivity to Example 1. Moreover, by TEM observations, a pattern in which an average distance between particles was 6 nm could be identified, but a phase separation structure having an interlaminar distance of 10 nm or more, shown in the definition of the present invention, could not identified.

Comparative Example 6

(Polymerization of Prepolymer a6 Represented by the Following General Formula (G5))

[Chemical Formula 22]

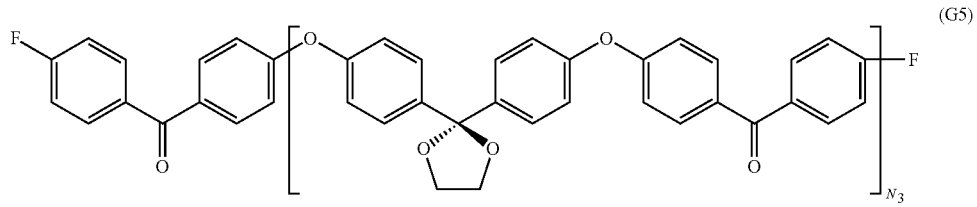

Into a 500 mL three-necked flask equipped with a stirrer, a nitrogen introducing tube and a Dean-Stark trap, 13.82 g (Aldrich reagent, 100 mmol) of potassium carbonate, 20.66 g (80 mmol) of K-DHBP obtained in the above Synthesis Example 1, and 19.2 g (Aldrich reagent, 88 mmol) of 4,4'-difluorobenzophenone were charged, and after the atmosphere in the flask was replaced by nitrogen, the resulting mixture was dehydrated at 180° C. in 90 mL of N-methyl pyrrolidone (NMP) and 45 mL of toluene, and the dehydrated content was heated to remove toluene and polymerization was carried out at 210° C. for 1 hours. The reaction solution was purified by reprecipitating with a large amount of water and a prepolymer a6 represented by the general formula (G5) was obtained by washing the precipitate with hot methanol. An average of N3 is 10 and the prepolymer a6 had a number average molecular weight of 5,000.

(Polymerization of Block Copolymer b6)

Into a 500 mL three-necked flask equipped with a stirrer, a nitrogen introducing tube and a Dean-Stark trap, 8.29 g (Aldrich reagent, 60 mmol) of potassium carbonate, 11.36 g (44 mmol) of K-DHBP obtained in the above Synthesis Example 1, and 16.89 g (40 mmol) of disodium 3,3'-disulfonate-4,4'-difluorobenzophenone obtained in the above Synthesis Example 2 were charged, and after the atmosphere in the flask was replaced by nitrogen, the resulting mixture was dehydrated at 180° C. in 90 mL of N-methyl pyrrolidone (NMP) and 45 mL of toluene, and the dehydrated content was heated to remove toluene and polymerization was carried out at 210° C. for 1 hour to obtain a prepolymer. The resulting prepolymer had a number average molecular weight of 7,000.

Next, 17.46 g (40 mmol) of prepolymer a6 and 20 mL of toluene were added, and the resulting mixture was dehydrated at 180° C. again, and the dehydrated content was heated to remove toluene and polymerization was carried out at 230° C. for 8 hours to obtain a block polymer b6. The resulting block polymer b6 had a weight average molecular weight of 235,000.

The block polymer b6 is composed of a block (B2) of the prepolymer a1 in which the above general formula (G5) is a repeating unit and a block (B1) of a repeating unit which is composed of the above general formula (G1) and disulfonate-benzophenone in proportions of 1:1. A ratio W1/W2 of the block polymer b6 is 20 mmol/20 mmol, namely, 1.

A 25 wt % N-methyl pyrrolidone (NMP) solution, in which the resulting block polymer b6 was dissolved, was pressure-filtered using a glass fiber filter and then applied and spread over a glass substrate. After drying at 100° C. for 4 hours and heating to 300° C. over 30 minutes under nitrogen, a heat treatment was carried out at 300° C. for 10 minutes to obtain a polyketal ketone membrane (membrane thickness 30 μm). The solubility of a polymer was extremely good. The membrane was immersed in 6N hydrochloric acid at 95° C. for 24 hours, subjected to proton substitution and deprotection reaction, and then was immersed in a large excess amount of pure water for 24 hours and then sufficiently washed to obtain a polymer electrolyte membrane. The density of a sulfonic acid group of the resulting membrane was 2.1 mmol/g.

In the resulting polymer electrolyte membrane, a crystallization temperature was recognized in DSC (the first heating stage), and a crystallization heat was 26.8 J/g. Also, a crystalline peak was not recognized in wide angle X-ray diffraction (the degree of crystallinity 0%). Since the polymer electrolyte membrane was an extremely tough electrolyte membrane and formed a phase separation structure because it appeared to become opaque. Its proton conductivity was 120 mS/cm. Even when the membrane was immersed in hot water or hot methanol, the membrane was neither dissolved nor collapsed and the rate L2/L1 of dimensional change was as small as 11%, and therefore the membrane was extremely excellent in resistance to hot water and resistance to hot methanol. Moreover, a phase separation structure in which an average interlaminar distance was 18 nm could be identified by TEM observations.

Comparative Example 7

(Polymerization of Prepolymer a7 Represented by the Above General Formula (G5))

In the same manner as in Example 6, except that the charge amount of 4,4'-difluorobenzophenone was changed to 18.33 g (Aldrich reagent, 84 mmol), a prepolymer a7 represented by the general formula (G5) was obtained. An average of N3 is 20 and the resulting prepolymer a7 had a number average molecular weight of 10,000.

(Polymerization of Block Copolymer b7)

In the same manner as in Example 6, except that the charge amount of 11.36 g (44 mmol) of K-DHBP obtained in the above Synthesis Example 1 was changed to 10.85 g (42 mmol), a prepolymer was obtained. The resulting prepolymer had a number average molecular weight of 14,000.

Next, 17.46 g (40 mmol) of prepolymer a6 and 20 mL of toluene were added, and the resulting mixture was dehydrated at 180° C. again, and the dehydrated content was heated to remove toluene and polymerization was carried out at 230° C. for 8 hours to obtain a block polymer b7. The block polymer b7 had a weight average molecular weight of 255,000. A ratio W1/W2 of the block polymer b7 was 20 mmol/20 mmol, namely, 1.

A polymer electrolyte membrane was prepared by the method described in Example 6 to obtain a polyketal ketone membrane (membrane thickness 30 μm). The solubility of the polymer was extremely good. The density of a sulfonic acid group of the resulting membrane was 2.1 mmol/g.

In the resulting polymer electrolyte membrane, a crystallization temperature was recognized in DSC (the first heating stage), and a crystallization heat was 34.1 J/g. Also, a crystalline peak was not recognized in wide angle X-ray diffraction (the degree of crystallinity 0%). Since the polymer electrolyte membrane was an extremely tough electrolyte membrane and formed a phase separation structure because it appeared td become opaque. Its proton conductivity was 131 mS/cm. Even when the membrane was immersed in hot water or hot methanol, the membrane was neither dissolved nor collapsed and the rate L2/L1 of dimensional change was as small as 13%, and therefore the membrane was extremely excellent in resistance to hot water and resistance to hot methanol. Moreover, a phase separation structure in which an average interlaminar distance was 40 nm could be identified by TEM observations.

Comparative Example 8

(Polymerization of Prepolymer a8 Represented by the Above General Formula (G5))

In the same manner as in Example 6, except that the charge amount of 4,4'-difluorobenzophenone was changed to 17.89 g (Aldrich reagent, 82 mmol), a prepolymer a8 represented by the general formula (G5) was obtained. An average of N3 is 40 and the prepolymer a7 had a number average molecular weight of 20,000.
(Polymerization of Block Copolymer b8)

In the same manner as in Example 6, except that 7.63 g of 4,4'-biphenol (manufactured by TOKYO CHEMICAL INDUSTRY Co., Ltd., 41 mmol) was used in place of 11.36 g (44 mmol) of K-DHBP obtained in the above Synthesis Example 1, a prepolymer was obtained. The prepolymer had a number average molecular weight of 29,000.

Next, 17.46 g (40 mmol) of prepolymer a8 and 20 mL of toluene were added, and the resulting mixture was dehydrated at 180° C. again, and the dehydrated content was heated to remove toluene and polymerization was carried out at 230° C. for 8 hours to obtain a block polymer b8. The block polymer b8 had a weight average molecular weight of 245,000. A ratio W1/W2 of the block polymer b8 was 20 mmol/20 mmol, namely, 1.

A polymer electrolyte membrane was prepared by the method described in Example 6 to obtain a polyketal ketone membrane (membrane thickness 30 μm). The solubility of the polymer was extremely good. The density of a sulfonic acid group of the resulting membrane was 2.1 mmol/g.

In the resulting polymer electrolyte membrane, a crystallization temperature was recognized in DSC (the first heating stage), and a crystallization heat was 22.4 J/g. Also, a crystalline peak was not recognized in wide angle X-ray diffraction (the degree of crystallinity 0%). Since the polymer electrolyte membrane was an extremely tough electrolyte membrane and formed a phase separation structure because it appeared to become opaque. Its proton conductivity was 144 mS/cm. Even when the membrane was immersed in hot water or hot methanol, the membrane was neither dissolved nor collapsed and the rate L2/L1 of dimensional change was as small as 14%, and therefore the membrane was extremely excellent in resistance to hot water and resistance to hot methanol. Moreover, a phase separation structure in which an average interlaminar distance was 110 nm could be identified by TEM observations.

Comparative Example 9

(Polymerization of Prepolymer a9 Represented by the Above General Formula (G5))

In the same manner as in Example 6, except that the charge amount of 4,4'-difluorobenzophenone was changed to 20.95 g (Aldrich reagent, 96 mmol), a prepolymer a9 represented by the general formula (G5) was obtained. An average of N3 is 5 and the resulting prepolymer a9 had a number average molecular weight of 3,000.
(Polymerization of Block Copolymer b9)

In the same manner as in Example 6, except that 8.94 g of 4,4'-biphenol (manufactured by TOKYO CHEMICAL INDUSTRY Co., Ltd., 48 mmol) was used in place of 11.36 g (44 mmol) of K-DHBP obtained in the above Synthesis Example 1, a prepolymer was obtained. The resulting prepolymer had a number average molecular weight of 4,000.

Next, 17.46 g (40 mmol) of prepolymer a8 and 20 mL of toluene were added, and the resulting mixture was dehydrated at 180° C. again, and the dehydrated content was heated to remove toluene and polymerization was carried out at 230° C. for 8 hours to obtain a block polymer b9. The block polymer b9 had a weight average molecular weight of 271,000. A ratio W1/W2 of the block polymer b9 was 20 mmol/20 mmol, namely, 1.

A polymer electrolyte membrane was prepared by the method described in Example 6 to obtain a polyketal ketone membrane (membrane thickness 30 μm). The solubility of the polymer was extremely good. The density of a sulfonic acid group of the resulting membrane was 2.1 mmol/g.

In the resulting polymer electrolyte membrane, a crystallization temperature was recognized in DSC (the first heating stage), and a crystallization heat was 20.1 J/g. Also, a crystalline peak was not recognized in wide angle X-ray diffraction (the degree of crystallinity 0%). Since the resulting polymer electrolyte membrane was an extremely tough electrolyte membrane and formed a phase separation structure because it appeared to become opaque. Its proton conductivity was 121 mS/cm. Even when the membrane was immersed in hot water or hot methanol, the membrane was neither dissolved nor collapsed and the rate L2/L1 of dimensional change was as small as 10%, and therefore the membrane was extremely excellent in resistance to hot water and resistance to hot methanol. Moreover, a phase separation structure in which an average interlaminar distance was 10 nm could be identified by TEM observations.

Comparative Example 10

A membrane was evaluated as a reverse osmosis membrane. In this example, a salt removal rate was determined by measuring a salt concentration of a supplied solution and a salt concentration of a permeated solution and substituting the resulting measurements into the following equation:

Salt removal rate (%)={1−(salt concentration of permeated solution)/(salt concentration of supplied solution)}×100.

Further, water permeability was expressed by a water quantity ($m^3/m^2 \cdot d$) passed through a membrane per unit time (day) and unit area ($m^2$).

A cloth-reinforced polysulfone support membrane (ultra-filtration membrane) which is used as a microporous support membrane was produced by the following technique. That is, a wet nonwoven fabric with a size of 30 cm long and 20 wide, which comprises mixed fiber of polyester fiber of 0.5 dtex in finess of single yarns and polyester fiber of 1.5 dtex in finess of single yarns and has permeability of 0.7 cm$^3$/cm$^2$·sec and an average pore size of 7 µm or less, was fixed onto a glass plate, and a dimethylformamide (DMF) solution (2.5 poise: 20° C.) having 15% by weight of polysulfone was casted thereon in such a way that an overall thickness is 200 µm, and the resulting glass plate was immediately immersed in water to prepare a microporous support membrane of polysulfone.

Next, a 25% by weight n-methylpyrrolidone (NMP) solution of the block polymer b6 obtained in Example 6 was applied onto the obtained microporous support membrane of polysulfone to form a functional layer having a thickness of 1 µm.

A complex semipermeable membrane thus obtained was subjected to a reverse osmosis test under the conditions of 0.5 MPa and 25° C. using a 0.2% by weight sodium chloride aqueous solution adjusted to a pH 6.5 as a raw water. Consequently, the water permeability was 0.60 m$^3$/m$^2$·d and sodium chloride removal rate was 97.0%, and this membrane exhibited a function as a reverse osmosis membrane.

INDUSTRIAL APPLICABILITY

The polymer electrolyte material and the polymer electrolyte membrane of the present invention can be applied for various electrochemical apparatus, for example, fuel cell, water electrolysis apparatus and chloroalkali electrolysis apparatus, and are preferably for a fuel cell, particularly preferably for fuel cell, using an aqueous hydrogen or methanol solution as a fuel.

The application of the polymer electrolyte fuel cell of the present invention is not particularly limited, and is preferably used as power supply sources for portable devices such as cellular phone, personal computer, PDA, video cameras, and digital cameras; household appliances such as cordless cleaners; toys; mobile objects, for example, vehicles such as electric bicycle, motorcycle, automobile, bus, and trucks, marine vessels, and railroads; substitutions of conventional primary and secondary cells, such as stationary type power generator; and combinations of these fuel cells with a hybrid power supply.

The invention claimed is:

1. A method comprising:
forming a polymer electrolyte form article with a polymer electrolyte material comprising an ionic group-containing block copolymer comprising a block (B1) containing an ionic group and a block (B2) substantially not containing an ionic group, wherein the block (B2) comprises a protecting group;
then removing the protecting group from the polymer electrolyte form article,
wherein the polymer electrolyte form article has a form comprising a membrane form, a plate-like form, a fiber-like form, or a hollow fiber-like form.

2. The method of claim 1, wherein the polymer electrolyte form article allows penetration of an acid solution.

3. The method of claim 1, wherein the protecting group is removed at room temperature.

4. The method of claim 1, wherein the protecting group is removed by an aqueous solution.

5. The method of claim 1, wherein the block copolymer comprises ketal.

6. The method of claim 1, wherein the removal of the protecting group comprises generating a ketone group.

7. The method of claim 1, wherein the polymer electrolyte material comprises polyether ketoneketone, polyetherether ketone, polyetherether ketoneketone, polyether ketone ether ketoneketone, or polyether ketone sulfone.

8. The method of claim 1, wherein the polymer electrode form article comprises a polymer electrolyte material comprising an ionic group-containing block copolymer comprising a block (B 1) containing an ionic group and a block (B2) substantially not containing an ionic group,
wherein the polymer electrolyte material has a phase separation structure,
wherein the polymer electrolyte material has a crystallization heat of 0.1 J/g or more, or a degree of crystallinity of 0.5% or more,
wherein the block (B 1) containing an ionic group comprises constituent units represented by the following general formulas (P1):

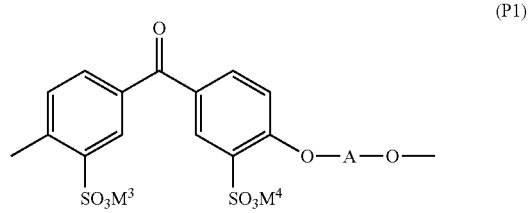

(P1)

in the general formulas (P1), A represents a divalent organic group containing an aromatic ring and M$^3$ and M$^4$ represent hydrogen, a metal cation, or an ammonium cation; and A may represent two or more kinds of groups:
wherein said A is at least one kind of constituent unit selected from the following general formulas (X-3):

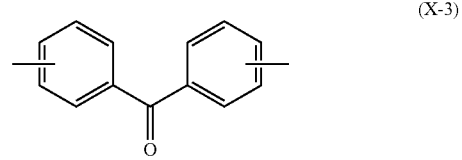

(X-3)

wherein the block (B2) substantially not containing the ionic group comprises a constituent unit represented by a general formula (Q1):

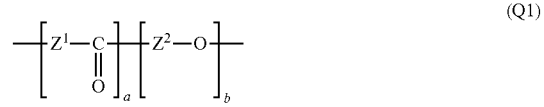

(Q1)

wherein (i) Z1 and Z2 independently represents a divalent organic group comprising one or more aromatic rings; and a and b each independently represent a positive integer; and (ii) Z1 and Z2 do not substantially contain an ionic group,
wherein the block (B1) and/or the block (B2) has a formula weight of 2000 or more.

9. The method of claim 1, wherein the polymer electrolyte form article has a form comprising a membrane form.

10. The method of claim 9, wherein the membrane form comprises a film and a film-shaped article.

11. The method of claim 1,
wherein the polymer electrolyte material has a phase separation structure,
wherein the polymer electrolyte material has a crystallization heat of 0.1 J/g or more, or a degree of crystallinity of 0.5% or more,
wherein the block (B2) substantially not containing the ionic group comprises a constituent unit represented by a general formula (Q1):

(Q1)

wherein (i) Z1 and Z2 independently represents a divalent organic group comprising one or more aromatic rings; and a and b each independently represent a positive integer; and (ii) Z1 and Z2 do not substantially contain an ionic group,
wherein the block (B1) and/or the block (B2) has a formula weight of 2000 or more.

12. The method of claim 1, wherein the ionic group has negative charge.

13. The method of claim 1, wherein the ionic group has a proton exchange capability.

14. The method of claim 1, wherein the polymer electrolyte material is resistant to hydrolysis.

* * * * *